United States Patent
Nasiri Khormuji

(10) Patent No.: US 10,270,569 B2
(45) Date of Patent: Apr. 23, 2019

(54) METHOD AND NODE IN A WIRELESS COMMUNICATION NETWORK

(71) Applicant: Huawei Technologies Co., Ltd., Shenzhen (CN)

(72) Inventor: Majid Nasiri Khormuji, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 16 days.

(21) Appl. No.: 15/388,997

(22) Filed: Dec. 22, 2016

(65) Prior Publication Data

US 2017/0104568 A1    Apr. 13, 2017

Related U.S. Application Data

(63) Continuation of application No. PCT/EP2014/077138, filed on Dec. 10, 2014.

(30) Foreign Application Priority Data

Jun. 24, 2014  (WO) ................ PCT/EP2014/063286

(51) Int. Cl.
  *H04L 5/00*  (2006.01)
  *H04B 1/7107*  (2011.01)
  (Continued)

(52) U.S. Cl.
  CPC ......... *H04L 5/0048* (2013.01); *H04B 1/7107* (2013.01); *H04B 7/0413* (2013.01);
  (Continued)

(58) Field of Classification Search
  CPC ............................ H04L 5/0048; H04L 5/0007
  See application file for complete search history.

(56) References Cited

U.S. PATENT DOCUMENTS

| | | | |
|---|---|---|---|
| 6,917,581 B2 * | 7/2005 | Proctor, Jr. ............ | H04B 1/707 370/208 |
| 8,588,051 B2 * | 11/2013 | Eriksson ................ | H04B 3/487 370/201 |

(Continued)

FOREIGN PATENT DOCUMENTS

| | | |
|---|---|---|
| CN | 102577196 A | 7/2012 |
| CN | 103688504 A | 3/2014 |

(Continued)

OTHER PUBLICATIONS

Li et al., "A Novel Semi-Dynamic Inter-Cell Interference Coordination Scheme Based on User Grouping," IEEE Vehicular Technology Conference, Institute of Electrical and Electronics Engineers, New York, New York (2009).

(Continued)

*Primary Examiner* — Rasheed Gidado
(74) *Attorney, Agent, or Firm* — Leydig, Voit & Mayer, Ltd.

(57) ABSTRACT

Network node and method in a network node, comprising: grouping a plurality of UEs into at least a first UE group and a second UE group; assigning a mutually orthogonal pilot sequence to each UE comprised in the first UE group; assigning a mutually orthogonal pilot sequence to each UE comprised in the second UE group; assigning a resource-offset to the UEs comprised in each UE group, by which each UE is allowed to start its transmission sub-frame in its Transmission Time Interval, TTI; and transmitting the assigned pilot sequences and the assigned resource-offset to UEs.

20 Claims, 10 Drawing Sheets

(51) Int. Cl.
  H04J 11/00 (2006.01)
  H04L 25/02 (2006.01)
  H04B 7/0413 (2017.01)
(52) U.S. Cl.
  CPC ........ H04J 11/0043 (2013.01); H04L 5/0007 (2013.01); H04L 5/0035 (2013.01); H04L 5/0053 (2013.01); H04L 25/0226 (2013.01); *H04B 2201/70701* (2013.01)

(56) References Cited

U.S. PATENT DOCUMENTS

| | | | | |
|---|---|---|---|---|
| 2004/0174939 | A1* | 9/2004 | Wang | H04L 1/005 375/316 |
| 2010/0278132 | A1 | 11/2010 | Palanki et al. | |
| 2011/0237267 | A1* | 9/2011 | Chen | H04J 11/003 455/450 |
| 2012/0120903 | A1* | 5/2012 | Kim | H04B 7/024 370/329 |
| 2012/0320847 | A1* | 12/2012 | Nam | H04W 72/0406 370/329 |
| 2014/0086093 | A1* | 3/2014 | Liu | H04J 13/10 370/252 |
| 2014/0204841 | A1* | 7/2014 | Ruiz Delgado | H04B 7/0689 370/328 |
| 2014/0226581 | A1 | 8/2014 | Nam et al. | |
| 2014/0348040 | A1* | 11/2014 | Hong | H04L 5/0007 370/280 |
| 2015/0358056 | A1* | 12/2015 | Kusunoki | H04B 7/0456 370/329 |
| 2016/0094324 | A1* | 3/2016 | Lee | H04L 5/0048 375/267 |

FOREIGN PATENT DOCUMENTS

| | | |
|---|---|---|
| EP | 1249980 A2 | 10/2002 |
| EP | 2151936 A1 | 2/2010 |
| WO | WO 2011041544 A2 | 4/2011 |
| WO | WO 2013091187 A1 | 6/2013 |
| WO | WO 2014208859 A1 | 12/2014 |
| WO | WO 2015008914 A1 | 1/2015 |

OTHER PUBLICATIONS

Shepard et al., "ArgosV2: A Flexible Many-Antenna Research Platform," ACM, Miami, FL (Sep. 30-Oct. 4, 2013).

Gao et al., "Linear pre-coding performance in measured very-large MIMO channels," (Jan. 1, 2011).

Marzetta, Noncooperative Cellular Wireless with Unlimited Number of Base Station Antennas, IEEE Transactions on Wireless Communications, vol. 9, No. 11, pp. 3590-3600, Institute of Electrical and Electronics Engineers, New York, New York (Nov. 2010).

Rusek et al., "Scaling Up MIMO; Opportunities and challenges with large arrays," IEEE Signal Processing Magazine, pp. 40-60, Institute of Electrical and Electronics Engineers, New York, New York (Jan. 2013).

Du et al., "Virtual HetNet: A Backhaul Free Pico Cell Implementation Solution," IEEE Globecom, pp. 2199-2203, Institute of Electrical and Electronics Engineers, New York, New York (2013).

Khormuji et al., "Semi-Orthogonal Multiple Access (SOMA)," (Mar. 27, 2014).

* cited by examiner

METHOD AND NODE IN A WIRELESS COMMUNICATION NETWORK

CROSS-REFERENCE TO RELATED APPLICATIONS

This application is a continuation of International Application No. PCT/EP2014/077138, filed on Dec. 10, 2014, which claims priority to International Application No. PCT/EP2014/063286, filed on Jun. 24, 2014. The disclosures of the aforementioned applications are hereby incorporated by reference in their entireties.

TECHNICAL FIELD

Implementations described herein generally relate to a network node and a method in a network node. In particular is herein described a mechanism for grouping User Equipments (UEs) into different UE groups.

BACKGROUND

The number of active antenna elements in an antenna array is increasing over time as may be observed by recent releases of Long Term Evolution (LTE) system where the newer releases support Multiple-Input Multiple-Output (MIMO) links with an increasing amount of antennas. Further increase in number of antenna elements, particularly at the base stations, is envisioned as an attractive physical-layer solution to improve the spectral efficiency of future communication systems such as fifth generation (5G) systems and in response to ever-increasing data traffic. So the term Massive MIMO (mMIMO) is employed to refer to the cases where the receivers and/or the transmitters enjoy many active antenna elements, such as e.g. hundreds of antenna elements. These types of mMIMO antenna systems are also known as Large-Scale Antenna Systems, Very Large MIMO, Hyper MIMO, Full-Dimension MIMO, Many-Antenna Base Stations and/or ARGOS.

To enable Space-Division Multiple-Access (SDMA) with mMIMO, the channel matrix between transmit antennas and receive antennas should be known. The channel estimation is an essential part as it allows separating the data streams associated with different User Equipments (UEs), served by the base station. In fact, one can view the channel matrix/vectors for example between different UEs and the base station as a spatial signature generated by the environment where one needs to learn such a random set of spatial signatures. Having learned the so-called spatial signatures, one can then try to perform spatial filtering (e.g. projection of the received baseband signals in the signal space spanned by the estimated channel vectors) at the receiver or spatial pre-coding (e.g. transmission of the data sequences in a properly chosen subspace of the signal space spanned by the estimated channel matrix) at the transmitter to ensure concurrent transmission and reception of multiple UEs with a negligible or no inter-user interference.

To estimate the channel between different nodes in a wireless communication network, i.e. UEs, base station/network node, access node, radio head, hyper transmitters, etc., one generally transmits pilot sequences known both by the transmitter and the receiver. These known pilot sequences are also referred to as reference signals/symbols or pilot signals/symbols. These expressions may sometimes be used alternatively for denoting the same thing as pilot sequences. Using these pilot sequences, the unknown radio channel between transmit and receive nodes may be estimated. Sending the pilot sequences in general leads to a loss in spectrally efficiency as it requires additional time-frequency resources to be used. The number and density of pilot sequences respectively depends on the number of antennas and time-frequency characteristics of the channel.

To learn the channel (e.g., the equivalent complex number affecting the transmitted signals for narrowband radio channels), at least one linear equation per number of unknowns is needed to find a meaningful estimation of the channel in general and in particular when the antenna spacing are configured such that it results to a full rank channel matrix. So to learn for example a downlink channel from a base station with $n_t$ antennas to K users each with $n_r$ antennas, at least $n_t$ pilots signal are needed; i.e. one pilot per antenna, or alternatively $n_t$ orthogonal sequences of length $n_t$ (or spanning a subspace with dimension $n_t$) are required. For uplink transmission, however the required number of pilot sequences changes to $Kn_r$. It may be noted that the number of pilot sequences increases linearly with the number of antennas and hence it does not scale favourably for massive antenna arrays.

A remedy to this shortcoming is to use the channel reciprocity. That is when the uplink and downlink transmissions occur over the same frequency band the uplink and downlink channel remains the same at a given time instant. So the Time-Division Duplex (TDD) operation allows using the number of pilot sequences according to:

$$\min\{Kn_r, n_t\} \quad (1)$$

In practice, the typical number of antennas at a User Equipment (UE), such as e.g. a mobile telephone, a computer tablet, a laptop with wireless capability or similar portable device, is kept low to allow smaller size, simpler processing for a longer battery life time and cheaper UE. However the base station may afford a larger number of antennas, where $n_r \ll n_t$. So for example for a scenario with massive MIMO at the base station and K UEs each with a single antenna the required number of pilot sequences in order to learn the uplink and downlink channel in TDD mode is equal to the number of UEs. For massive MIMO, it is expected to have $K \ll n_t$, which results in an affordable overhead associated to the pilot sequences.

The density of the pilot sequences depends on the radio channel characteristic. The characteristics of the radio channel change over time and frequency. However the variations in time depend on the mobility of the UEs. The faster the UEs move, the faster the channel in time changes due to a larger Doppler frequency. The radio channel can be assumed unchanged within the coherence time $T_c$, which is a function of the carrier frequency and the velocity of the UEs. So to learn the channel between transmit and receive antennas over a coherence time, at least one pilot symbol per coherence time is needed. Similarly, the radio channel varies in frequency. However the changes in the frequency are generally characterised by the coherence bandwidth, $B_c$, which depends on the delay profile of the channel and the symbol duration.

To sum-up, in order to learn the radio channel in the time-frequency grid in the TDD mode for mMIMO communication in a cell with K UEs each with a single antenna, K orthogonal pilot sequences, each associated to a UE, are required over a time-frequency grid of the size $T_c \times B_c$.

FIG. 1A depicts a conventional transmission frame structure for Time-Division Duplex (TDD) communications where each frame is consisted of multiple subframes. In FIG. 1A, there are L subframes. Each subframe comprises pilot data, for channel estimation, control signals for uplink and downlink transmission and then the data transmission. Each subframe is a grid of Resource Elements (REs) over time and frequency, where each resource element consumes one symbol duration and one subcarrier. The guard intervals may also be situated between uplink and downlink transmissions as well as between the pilot region and data region, which however for simplicity of exposition have been omitted.

Non-orthogonal multiple-access is the paradigm to concurrently schedule multiple UEs over the same time-frequency resource element. One appealing approach to separate the uplink superimposed data streams may be to use spatial domain provided by a plurality of antennas. Toward this end, the receiver needs to estimate the channels from each UE and then using the estimated channels to perform spatial filtering to remove the cross-talk, i.e. interference, among the superimposed streams.

FIG. 1B illustrates the uplink transmission for K UEs over shared time-frequency resource elements where each frame has two regions: pilot region and data region which also comprises the control data.

To overcome the pilot contamination, it is required to ensure the pilot sequences transmitted in the time-frequency grid dedicated to the pilot transmissions are orthogonal to one another. One example of orthogonal pilot transmission is illustrated in FIG. 1C. The conventional solution is to schedule multiple UEs where the total number of UEs in the cell is less than the total number of orthogonal sequences. FIG. 1C depicts the one example for orthogonal pilot transmission obtained by Time-Division Multiplexing (TDM) in the pilot region, and non-orthogonal data transmission over shared uplink resources. It is understood that in the pilot region one may use Frequency-Division Multiplexing (FDM) or a combination of FDM and TDM. For uplink transmission however, the UEs may employ the pilot sequences over the entire sub-band, for which TDM or Code-Division Multiplexing (CDM) over pilot may be used, such as pilots with covering code used in LTE.

However, the maximum number of orthogonal sequences that may be placed in the pilot time-frequency grid is limited. This consequently puts a limit on the number of scheduled UEs regardless of the number of antennas. So the prior art is incapable to allow UE scheduling beyond half of the coherence time and also leads to intra-cell (for pilot sequence reuse within a cell) or inter-cell interference for reused pilot sequences across different cells.

For TDD mMIMO communications when the number of antennas is very large, the limiting factor for achieving high network throughput is the limited number of orthogonal pilot sequences. For radio channels with the coherence time $T_c$ symbols, for high number of antennas, in order to maximise the aggregate throughput, it is optimal to allocate half of the coherence time for channel training, i.e. transmitting pilot or reference sequences. Therefore, the conventional solution is designed to schedule up to:

$$K = \left\lfloor \frac{T_c}{2} \right\rfloor \quad (2)$$

UEs within each coherence interval. For multi-carrier systems:

$$K = \left\lfloor \frac{B_c T_c}{2} \right\rfloor,$$

where $B_c$ denotes the coherence bandwidth. In general, it is desirable to schedule more users; i.e., provide service to as many as UEs as the number nodes that require connection are increasing over time. However, the higher number of active UEs leads to higher interference among UEs and hence it is not clear how the aggregate rate will affected. In particular, for mMIMO, scheduling more UEs beyond that in equation (2), leads to the pilot contamination which causes severe degradations in the performance. To illustrate the pilot contamination phenomena; consider two UEs that transmit the same pilot symbol followed by data symbol sequences over shared uplink. Then the access node receives the signal:

$$y_p = h_1 x_p + h_2 x_p + z_p, \quad (3)$$

wherein $y_p$ denotes the received noisy signal vector of dimension $n_r \times 1$, $x_p$ denotes the transmitted pilot symbol from both UEs (i.e. pilot reuse), $h_i$ denotes the channel vector between UE i and the antenna array at the access node, which has the dimension $n_r \times 1$, and $z_p$ denotes Average White Gaussian Noise (AWGN), which has the dimension $n \times 1$.

Then, using minimum mean-square error (MMSE) channel estimation, the estimated channel will be:

$$\hat{h} = h_1 + h_2 + z_e, \quad (4)$$

where $z_e$ denotes channel estimation error.

The received noisy superimposed data may then be written as:

$$y_d = h_1 x d_1 + h_2 x_{d2} + z_d, \quad (5)$$

where $y_d$ denotes the received noisy signal vector of dimension $n_r \times 1$, $x_{di}$ denotes the transmitted data symbol from UE i, $h_i$ denotes the channel vector between UE i and the receiver, which has the dimension $n_r \times 1$, and $z_d$ denotes AWGN, which has the dimension $n_r \times 1$. The access node then performs spatial filtering to separate the data stream for the first UE. For a very large array, i.e. $n_r \gg 1$, the Matched Filtering (MF), a.k.a. Maximum-Ratio Combining (MRC) is optimal and the following rate is achievable:

$$R = \log\left(1 + \frac{P_1}{P_2}\right), \quad (6)$$

where independent and identically distributed (i.i.d.) Rayleigh fading with unit variance is assumed and the average transmit power of each user is set to $P_i$. From equation (6), it is seen that large antenna arrays under pilot contamination helps to remove the noise and small-scale fading but the inter-user interference remains. Thus for $P_1 = P_2$, $R = 0.5$ [bit/s/Hz] at maximum is achievable. The actual rate by accounting the pilot overhead will be even less. Therefore pilot reuse causes significant rate-loss in spite of the fact that there exist many active antenna elements.

Semi-Orthogonal Multiple-Access (SOMA) is a solution constructed in a way that it enables to schedule twice as many UEs in each coherence interval as compared to the conventional TDD yet avoiding the pilot contamination. The construction of SOMA is in a way that it possesses a semi-orthogonal feature in signal transmission such that in a given time slot some users appear orthogonal while the remaining users may transmit non-orthogonally. The main shortcoming of SOMA is that the channels of the UEs cannot be estimated simultaneously without interference. However, by sequential decoding the interference-free sequential channel estimation becomes feasible. Thus, having estimated the first channel vector only matched filtering for spatial filtering can be employed since the other channels are unknown. Matched Filtering is optimal for very large arrays, however for smaller size arrays, other spatial filtering such as zero-forcing (ZF) and MMSE processing can outperform that with Matched Filtering.

It appears that further development is required in order to be able to schedule more UEs in a network by a network node to provide higher aggregate rates, in particular in a massive MIMO environment where intense pilot signalling is required.

SUMMARY

It is therefore an object to obviate at least some of the above mentioned disadvantages and to improve the performance in a wireless communication network.
This and other objects are achieved by the features of the appended independent claims. Further implementation forms are apparent from the dependent claims, the description and the figures.

According to a first aspect, a network node is provided. The network node may be configured to receive data from a plurality of User Equipments (UEs) over a plurality of shared time-frequency resources, which network node is connected to an antenna array with at least one active antenna element. The network node comprises a processing unit. The processing unit is configured to group a plurality of UEs into at least a first UE group and a second UE group. Further, the processing unit is configured to assign a mutually orthogonal pilot sequence to each UE comprised in the first UE group. Also, the processing unit is further configured to assign a mutually orthogonal pilot sequence to each UE comprised in the second UE group. Additionally, the processing unit is configured to assign a resource-offset to the UEs comprised in each UE group, by which each UE is allowed to start its transmission sub-frame in its Transmission Time Interval (TTI). Further, the network node comprises a transmitter configured to transmit the pilot sequences and the resource-offset to UEs.

By grouping UEs into different UE groups and allowing UEs to reuse pilot sequences of other UE groups, more UEs may be scheduled for uplink transmission in comparison with conventional solutions. By assigning a resource offset to UEs in a UE group, pilot contamination may be avoided, when pilot sequences are reused. Thanks to the described network node and method performed therein, a new multiple access technique is achieved. Thereby, also a higher spectral efficiency is achieved, in comparison with conventional solutions.

In a first possible implementation of the network node according to the first aspect, the processing unit is further configured to assign the resource-offset such that the pilot sequences of the UEs in the first UE group are not interfered by the pilot sequences of the UEs in the second UE group.

By assigning a resource offset to UEs in a UE group, pilot contamination may be avoided, when pilot sequences are reused.

In a second possible implementation of the network node according to the first aspect, or according to the first possible implementation thereof, the processing unit is further configured to assign and transmit a partial blanking pattern sequence to UEs comprised in at least one of the UE groups, wherein the partial blanking pattern sequence has a granularity equal to granularity of the pilot sequences of UEs comprised in other UE groups, for reducing the interference among the UE groups.

By applying a partial subframe blanking, the aggregate throughput of the system is enhanced.

In a third possible implementation of the network node according to the first aspect, or according to any previous possible implementation thereof, the processing unit is further configured to update the grouping of UEs, the assigning of pilot sequences, the assigning of resource-offset sequences or the assigning of partial blanking pattern sequences, based on UE mobility, channel conditions, active number of UEs within range and transmission load.

By updating and re-performing the grouping of UEs continuously, or at certain predetermined time intervals, the grouping and assignment of resources may be continuously optimised and compensation for UEs' movement within the cell may be made.

In a fourth possible implementation of the network node according to the first aspect, or according to any previous possible implementation thereof, the processing unit is configured to group the plurality of UEs into at least the first UE group and the second UE group, based on cell location of each UE.

Thereby, by grouping the UEs based on physical position, e.g. which cell the UE is positioned in, the reduced risk of interference between pilot sequences be re-used by other groups may be reduced as it may be possible to filter out such interfering pilot sequences, e.g. in case of Massive MIMO implementation, where interfering signals may be filtered out from the direction of the source of the interfering signal.

In a fifth possible implementation of the network node according to the first aspect, or according to any previous possible implementation thereof, the processing unit is furthermore configured to group the UEs situated within a Macro cell into the first UE group, and to group the UEs situated within a virtual Pico cell into the second UE group.

Again, by grouping the UEs based on physical position, e.g. which cell the UE is positioned in, the reduced risk of interference between pilot sequences be re-used by other groups may be reduced as it may be possible to filter out such interfering pilot sequences, e.g. in case of Massive MIMO implementation, where interfering signals may be filtered out from the direction of the source of the interfering signal.

In a sixth possible implementation of the network node according to the first aspect, or according to any previous possible implementation thereof, the processing unit is furthermore configured to group the UEs, based on Channel Quality Index (CQI) wherein UEs associated with a CQI lower than a threshold value are grouped in the first UE group. The CQI may represent an index in a lookup table where the index enumerates for example Signal-to-Noise Ratio (SNR) or Signal-to-Noise-plus-Interference Ratio (SINR).

UEs having a low CQI may typically be positioned at the cell border and are in particular sensitive to interference. By the disclosed implementation, these UEs are grouped in the first group, wherein there is no interference by any simultaneously transmitted pilot sequences from other UEs in other UE groups. Thereby, it is avoided that the communication link to such UE is lost.

In a seventh possible implementation of the network node according to the first aspect, or according to any previous possible implementation thereof, the processing unit is further configured to coordinate reception and transmission at a plurality of access nodes, associated with the network node in Coordinated Multi-Point (CoMP) transmissions.

Thereby communication of a UE via a plurality of access nodes in CoMP transmissions is enabled.

In an eighth possible implementation of the network node according to the first aspect, or according to any previous possible implementation thereof, the network node further comprises a receiver. The receiver is configured to receive the mutually orthogonal pilot sequences and data sequences from the UEs grouped in the first UE group and to receive the mutually orthogonal pilot sequences and data sequences from the UEs grouped in the second UE group. The processing unit is further configured to estimate a channel of each UE in the first UE group, based on the received mutually orthogonal pilot sequences of UEs grouped in the first UE group. Also, the processing unit is further configured to detect the data sequences of the UEs in the first UE group, which data sequences are used to cancel interference over received pilot sequences of UEs grouped in the second UE group. In addition, the processing unit is configured to estimate a channel of each UE in the second UE group, based on the received mutually orthogonal pilot sequences of UEs grouped in the second UE group. Furthermore, the processing unit is also configured to detect the data sequences of the UEs in the second UE group, wherein the data sequences are used to cancel interference over the received pilot sequences from UEs grouped in the first UE group.

Thereby further improvements are enabled.

In a ninth possible implementation of the network node according to the first aspect, or according to any previous possible implementation thereof, the processing unit is further configured to sequentially continue the channel estimation and data detection process, iteratively.

By updating and re-performing the grouping of UEs continuously, or at certain predetermined time intervals, the grouping and assignment of resources may be continuously optimised and compensation for UEs movement within the cell may be made.

In a tenth possible implementation of the network node according to the first aspect, or according to any previous possible implementation thereof, the processing unit is further configured to instruct at least one UE to adjust transmission power, based on at least one of: the channel estimation of each UE group and the interference among the UE groups.

By adjusting the transmission power, interference between UEs in the uplink may be further reduced.

According to a second aspect, a method in a network node is provided. The method comprises grouping a plurality of UEs into at least a first UE group and a second UE group. Further, the method also comprises assigning a mutually orthogonal pilot sequence to each UE comprised in the first UE group. In addition, the method comprises assigning a mutually orthogonal pilot sequence to each UE comprised in the second UE group. Further, the method comprises assigning a resource-offset to the UEs comprised in each UE group, by which each UE is allowed to start its transmission sub-frame in its TTI. The method also comprises transmitting the assigned pilot sequences and the assigned resource-offset to UEs.

By grouping UEs into different UE groups and allowing UEs to reuse pilot sequences of other UE groups, more UEs may be scheduled for uplink transmission in comparison with conventional solutions. By assigning a resource offset to UEs in a UE group, pilot contamination may be avoided, when pilot sequences are reused. Thanks to the described network node and method performed therein, a new multiple access technique is achieved. Thereby, also a higher spectral efficiency is achieved, in comparison with conventional solutions.

In a first possible implementation of the method according to the second aspect, the method further comprises assigning the resource-offset such that the pilot sequences of the UEs in the first UE group are not interfered by the pilot sequences of the UEs in the second UE group.

By assigning a resource offset to UEs in a UE group, pilot contamination may be avoided, when pilot sequences are reused.

In a second possible implementation of the method according to the second aspect, or according to the first possible implementation thereof, a partial blanking pattern sequence may be assigned and transmitted to UEs comprised in at least one of the UE groups, wherein the partial blanking pattern sequence has a granularity equal to granularity of the pilot sequences of UEs comprised in other UE groups, for reducing the interference among the UE groups.

By applying a partial subframe blanking, the aggregate throughput of the system is enhanced.

In a third possible implementation of the method according to the second aspect, or according to any previous possible implementation thereof, the grouping of UEs, the assigning of pilot sequences, the assigning of resource-offset sequences or the assigning of partial blanking pattern sequences may be updated, based on UE mobility, channel conditions, active number of UEs within range and transmission load.

By updating and re-performing the grouping of UEs continuously, or at certain predetermined time intervals, the grouping and assignment of resources may be continuously optimised and compensation for UEs' movement within the cell may be made.

In a fourth possible implementation of the method according to the second aspect, or according to any previous possible implementation thereof, the grouping of the plurality of UEs into at least the first UE group and the second UE group may be based on cell location of each UE.

Thereby, by grouping the UEs based on physical position, e.g. which cell the UE is positioned in, the reduced risk of interference between pilot sequences be re-used by other groups may be reduced as it may be possible to filter out such interfering pilot sequences, e.g. in case of Massive MIMO implementation, where interfering signals may be filtered out from the direction of the source of the interfering signal.

In a fifth possible implementation of the method according to the second aspect, or according to any previous possible implementation thereof, the grouping of the UEs situated within a Macro cell may be made into the first UE group, and the grouping of the UEs situated within a virtual Pico cell may be made into the second UE group.

Again, by grouping the UEs based on physical position, e.g. which cell the UE is positioned in, the reduced risk of interference between pilot sequences be re-used by other groups may be reduced as it may be possible to filter out such interfering pilot sequences, e.g. in case of Massive MIMO implementation, where interfering signals may be filtered out from the direction of the source of the interfering signal.

In a sixth possible implementation of the method according to the second aspect, or according to any previous possible implementation thereof, the grouping of the UEs may be made based on CQI wherein UEs associated with a CQI lower than a threshold value are grouped in the first UE group.

UEs having a low CQI may typically be positioned at the cell border and are in particular sensible for interference. By the disclosed implementation, these UEs are grouped in the first group, wherein there is no interference by any simultaneously transmitted pilot sequences from other UEs in other UE groups. Thereby, it is avoided that the communication link to such UE is lost.

In a seventh possible implementation of the method according to the second aspect, or according to any previous possible implementation thereof, a coordination may be made of reception and transmission at a plurality of access nodes, associated with the network node in CoMP transmissions.

Thereby communication of a UE via a plurality of access nodes in CoMP transmissions is enabled.

In an eighth possible implementation of the method according to the second aspect, or according to any previous possible implementation thereof, the method further comprises receiving the mutually orthogonal pilot sequences and data sequences from the UEs grouped in the first UE group and to receive the mutually orthogonal pilot sequences and data sequences from the UEs grouped in the second UE group. The method further comprises estimating a channel of each UE in the first UE group, based on the received mutually orthogonal pilot sequences of UEs grouped in the first UE group. Also, the method also comprises detecting the data sequences of the UEs in the first UE group, which data sequences are used to cancel interference over received pilot sequences of UEs grouped in the second UE group. In addition, the method also comprises estimating a channel of each UE in the second UE group, based on the received mutually orthogonal pilot sequences of UEs grouped in the second UE group. Furthermore, the method also comprises detecting the data sequences of the UEs in the second UE group, wherein the data sequences may be used to cancel interference over the received pilot sequences from UEs grouped in the first UE group.

Thereby further improvements are enabled.

In a ninth possible implementation of the method according to the second aspect, or according to any previous possible implementation thereof, the method further comprises sequentially continuing the channel estimation and data detection process, iteratively.

By updating and re-performing the grouping of UEs continuously, or at certain predetermined time intervals, the grouping and assignment of resources may be continuously optimised and compensation for UEs' movement within the cell may be made.

In a tenth possible implementation of the method according to the second aspect, or according to any previous possible implementation thereof, the method further comprises instructing at least one UE to adjust transmission power, based on at least one of: the channel estimation of each UE group and the interference among the UE groups.

By adjusting the transmission power, interference between UEs in the uplink may be further reduced.

According to a third aspect, a computer program comprises program code for performing a method according to the second aspect, or any possible implementation thereof, when the computer program runs on a computer.

By grouping UEs into different UE groups and allowing UEs to reuse pilot sequences of other UE groups, more UEs may be scheduled for uplink transmission in comparison with conventional solutions. By assigning a resource offset to UEs in a UE group, pilot contamination may be avoided, when pilot sequences are reused. Thanks to the described network node and method performed therein, a new multiple access technique is achieved. Thereby, also a higher spectral efficiency is achieved, in comparison with conventional solutions. Thereby an improved performance within the wireless communication network is provided.

Other objects, advantages and novel features of the described different aspects of the invention will become apparent from the following detailed description.

BRIEF DESCRIPTION OF THE DRAWINGS

Various embodiments of the invention are described in more detail with reference to attached drawings illustrating examples of embodiments of the invention in which.

DETAILED DESCRIPTION

Embodiments of the invention described herein are defined as a network node and a method in a network node, which may be put into practice in the embodiments described below. These embodiments may, however, be exemplified and realised in many different forms and are not to be limited to the examples set forth herein; rather, these illustrative examples of embodiments are provided so that this disclosure will be thorough and complete.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 2:
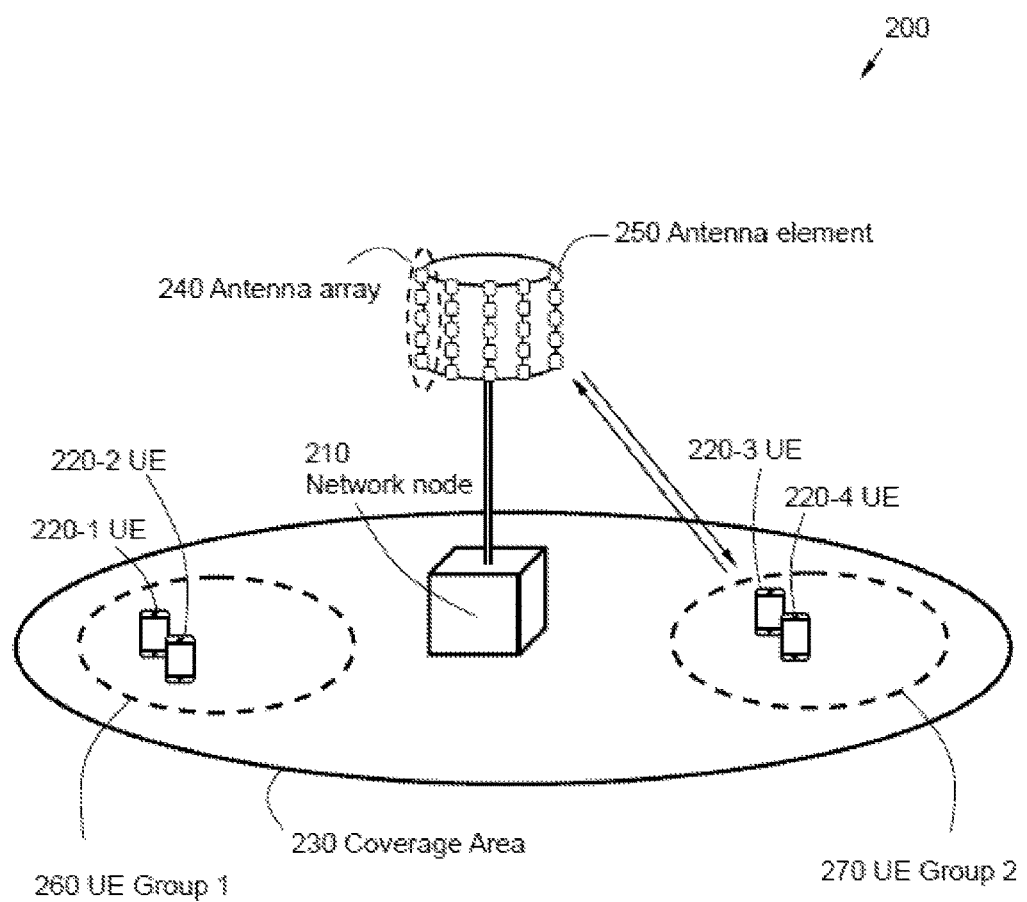
FIG. 2 is a block diagram illustrating a wireless communication network according to some embodiments of the invention.

FIG. 2 is a schematic illustration over a wireless communication network 200 comprising a network node 210 and a number of User Equipment (UEs) 220-1, 220-2, 220-3, 220-4. The network node 210 comprises, or is connected to an access node having radio communication ability within a coverage area 230. The network node 210 also comprises, or is connected to an antenna array 240, comprising at least one antenna element 250. In some embodiments, the antenna array 240 may be configured for MIMO, or massive MIMO communication. Massive MIMO is sometimes loosely defined as a system comprising 100 or more antenna elements 250. Advantages with massive MIMO comprise e.g. improved UE detection, reduced transmit power per UE 220-1, 220-2, 220-3, 220-4, and higher aggregate rate thanks to a high spatial resolution of massive MIMO.

The wireless communication network 200 may at least partly be based on, or inspired by, radio access technologies such as, e.g., 3rd Generation Partnership Project (3GPP) LTE, LTE-Advanced, Evolved Universal Terrestrial Radio Access Network (E-UTRAN), Universal Mobile Telecommunications System (UMTS), just to mention some few options.

The expressions "wireless communication network", "wireless communication system" and/or "cellular telecommunication system" may within the technological context of this disclosure sometimes be utilised interchangeably.

The wireless communication network 200 may be configured to operate according to the Time Division Duplex (TDD) principle and in the subsequent description and associated figures, embodiments will be consequently described in a TDD environment. However, some embodiments may be based on, or implemented in a Frequency Division Duplex (FDD) environment.

TDD is an application of time-division multiplexing to separate uplink and downlink signals in time, possibly with a Guard Period (GP) situated in the time domain between the uplink and downlink signalling and/or between the pilot region and data region. FDD means that the transmitter and receiver operate at different carrier frequencies.

Figure 1A:
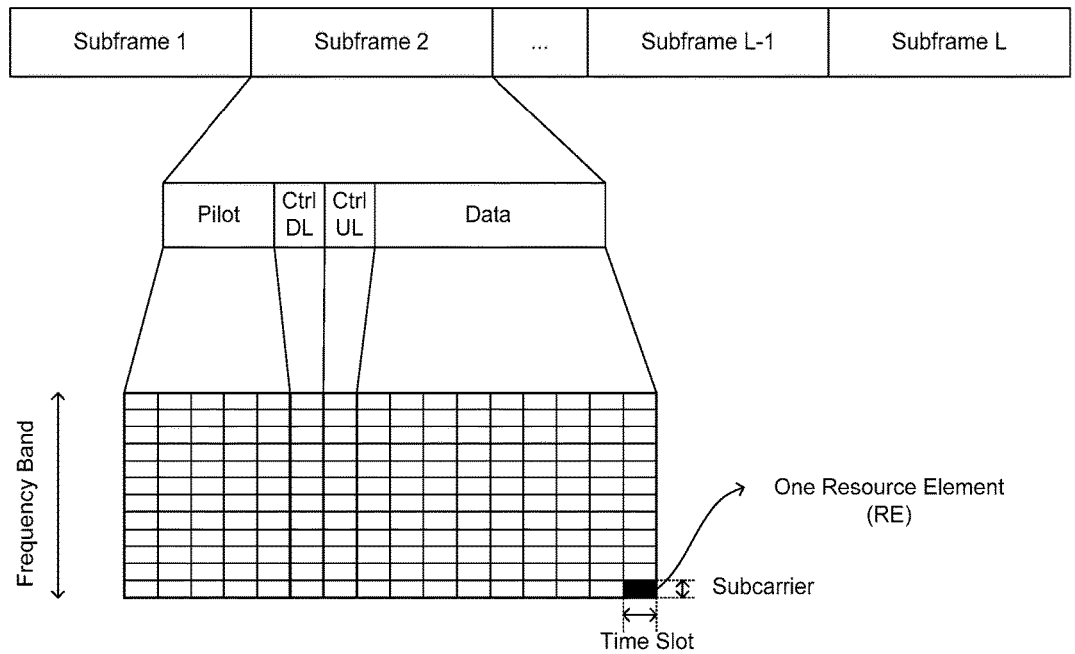
FIG. 1A is a block diagram illustrating a transmission frame according to conventional solutions.
Figure 1B:
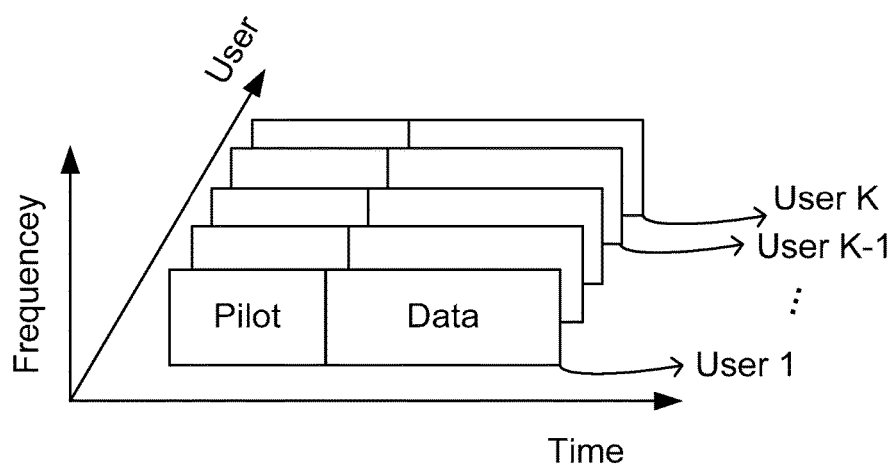
FIG. 1B is a block diagram illustrating multi user scheduling according to conventional solutions.
Figure 1C:
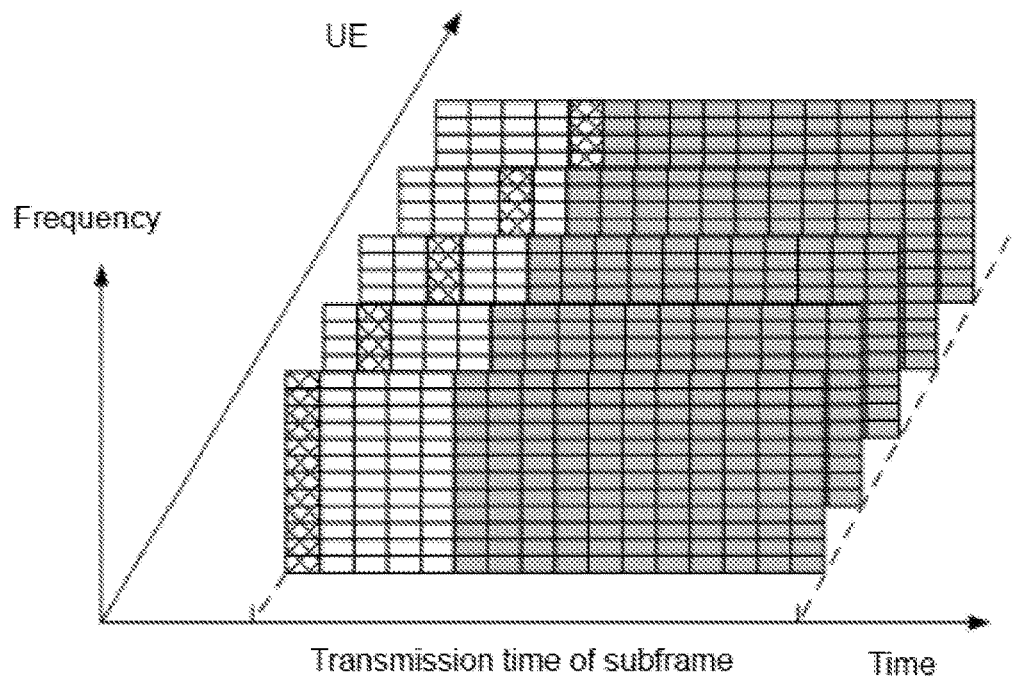
FIG. 1C is a block diagram illustrating multi user scheduling according to conventional solutions.

The purpose of the illustration in FIG. 2 is to provide a simplified, general overview of the wireless communication network 200 and the involved methods and nodes, such as the network node 210 and UEs 220-1, 220-2, 220-3, 220-4 herein described, and the functionalities involved. Further, a new multiple-access technique is presented that enables to schedule more UEs 220-1, 220-2, 220-3, 220-4 for uplink transmission over shared channels as compared with conventional solutions that utilise orthogonal pilot transmission in a cell, as illustrated in FIG. 1A. Thereby, the spectrally efficiency for MIMO and in particular massive MIMO communications is improved. The solution may be regarded as generalisation of the previously described SOMA and may hence be referred to as Generalised SOMA (GSOMA) subsequently, but without the disadvantages associated with SOMA as subsequently will be further explained.

More specifically, embodiments herein provide a method for communication of multiple data packets originated from multiple UEs 220-1, 220-2, 220-3, 220-4 such that the UEs 220-1, 220-2, 220-3, 220-4 are grouped such that some UEs 220-1, 220-2 are grouped in a first UE group 260 and some other UEs 220-3, 220-4 are grouped in a second UE group 270.

The UEs 220-1, 220-2, 220-3, 220-4 within each group 260, 270 are assigned mutually orthogonal pilot sequences within the same group 260, 270. However, UEs 220-1, 220-2, 220-3, 220-4 in other different groups 260, 270 are allowed to reuse the same set of orthogonal pilot sequences as has been used by a UE 220-1, 220-2, 220-3, 220-4 in another UE group 260, 270.

GSOMA comprises both the SOMA scheme and the conventional TDD solution as special cases. When each group 260, 270 comprises merely one UE 220-1, 220-2, 220-3, 220-4 and no blanking is used, GSOMA reduces to SOMA. When there is only one group with a maximum number of UEs 220-1, 220-2, 220-3, 220-4, then GSOMA reduces to the conventional TDD wherein only orthogonal pilot sequences are used. Therefore, a properly designed GSOMA can combine the advantages of both SOMA and conventional TDD.

In some embodiments the data packets within each UE group 260, 270 may be aligned based on a resource-offset comprising time- and frequency-offset communicated to the UE 220-1, 220-2, 220-3, 220-4 to avoid pilot contamination when the pilot sequences are reused. The resource-offset is designed such that the pilot sequences of a group 260, 270 does not receive any interference.

In another embodiment of the solution, the UE group 260, 270 may additionally employ partial subframe blanking to enhance the aggregate throughput of the system 200. In yet another embodiment UE grouping may be performed in the network level where the groups 260, 270 may compromise UEs 220-1, 220-2, 220-3, 220-4 in Macro- and/or virtual Pico cells, respectively.

It is to be noted that the illustrated network setting of one network node 210, four UEs 220-1, 220-2, 220-3, 220-4 and two UE groups 260, 270 in FIG. 2 is to be regarded as a non-limiting example of an embodiment only. The wireless communication network 200 may comprise any other number and/or combination of network nodes 210 and/or UEs 220-1, 220-2, 220-3, 220-4. Any other arbitrary plurality of UEs 220-1, 220-2, 220-3, 220-4, UE groups 260, 270 and another configuration of network nodes 210 may thus be involved in some embodiments of the disclosed invention.

The network node 210 may according to some embodiments be configured for downlink transmission and uplink reception may be referred to, respectively, as e.g., a base station, NodeB, evolved Node Bs (eNB, or eNode B), base transceiver station, Access Point Base Station, base station router, Radio Base Station (RBS), micro base station, pico base station, femto base station, Home eNodeB, sensor, beacon device, relay node, repeater or any other network node configured for communication with the UEs 220-1, 220-2, 220-3, 220-4 over a wireless interface, depending, e.g., of the radio access technology and/or terminology used.

The UEs 220-1, 220-2, 220-3, 220-4 may correspondingly be represented by, e.g. a wireless communication terminal, a mobile cellular phone, a Personal Digital Assistant (PDA), a wireless platform, a mobile station, a tablet computer, a portable communication device, a laptop, a computer, a wireless terminal acting as a relay, a relay node, a mobile relay, a Customer Premises Equipment (CPE), a Fixed Wireless Access (FWA) nodes or any other kind of device configured to communicate wirelessly with the network node 210, according to different embodiments and different vocabulary.

An example of an embodiment will subsequently be described. In such embodiment, the UEs 220-1, 220-2, 220-3, 220-4 are grouped into J groups where each group j contains $k_j$ UEs 220-1, 220-2, 220-3, 220-4 for $j \in \{1, 2, \ldots, J\}$ where $K = \Sigma_{j=1}^{J} k_j$ is the total number of the UEs 220-1, 220-2, 220-3, 220-4. See FIG. 2 for an illustration. The UE i in UE group $j \in \{1, 2, \ldots, J\}$ uses the pilot sequences $s_i$. That is the pilot sequences are reused. The pilot sequences within each UE group 260, 270 are orthogonal (i.e. the inner product or the cross correlation of the two pilot sequences are zero) such that it allows interference-free channel estimation for UEs 220-1, 220-2, 220-3, 220-4 in each UE group 260, 270. The maximum number of pilot sequences therefore may be max $k_j$.

Conventional reuse of pilot sequences where the pilot sequences interfere with one another results in "pilot contaminations" which severely degrades the performance of the UEs 220-1, 220-2, 220-3, 220-4. However with this new solution, it is allowed to reuse the pilot sequences in a controlled fashion. A pilot reuse is performed non-orthogonally to boost the spectral efficiency of the system 200. However, the interference may be controlled by a transmission of a resource-offset such as for example timing-offset or frequency-offset. Thus, the pilot sequences of different UE groups 260, 270 may be received non-orthogonally, for example non-overlapping time slots with timing-offset or non-overlapping frequency with frequency offset. Also, the pilot sequences of the first UE group 260 are received interference-free. That is the other UEs 220-1, 220-2 grouped in the first UE group 260 appear silent at the receiver side. The pilot sequences of UE group $j \in \{1, 2, \ldots, J\}$, are only interfered by data symbols of UEs 1 to j−1.

Figure 3:
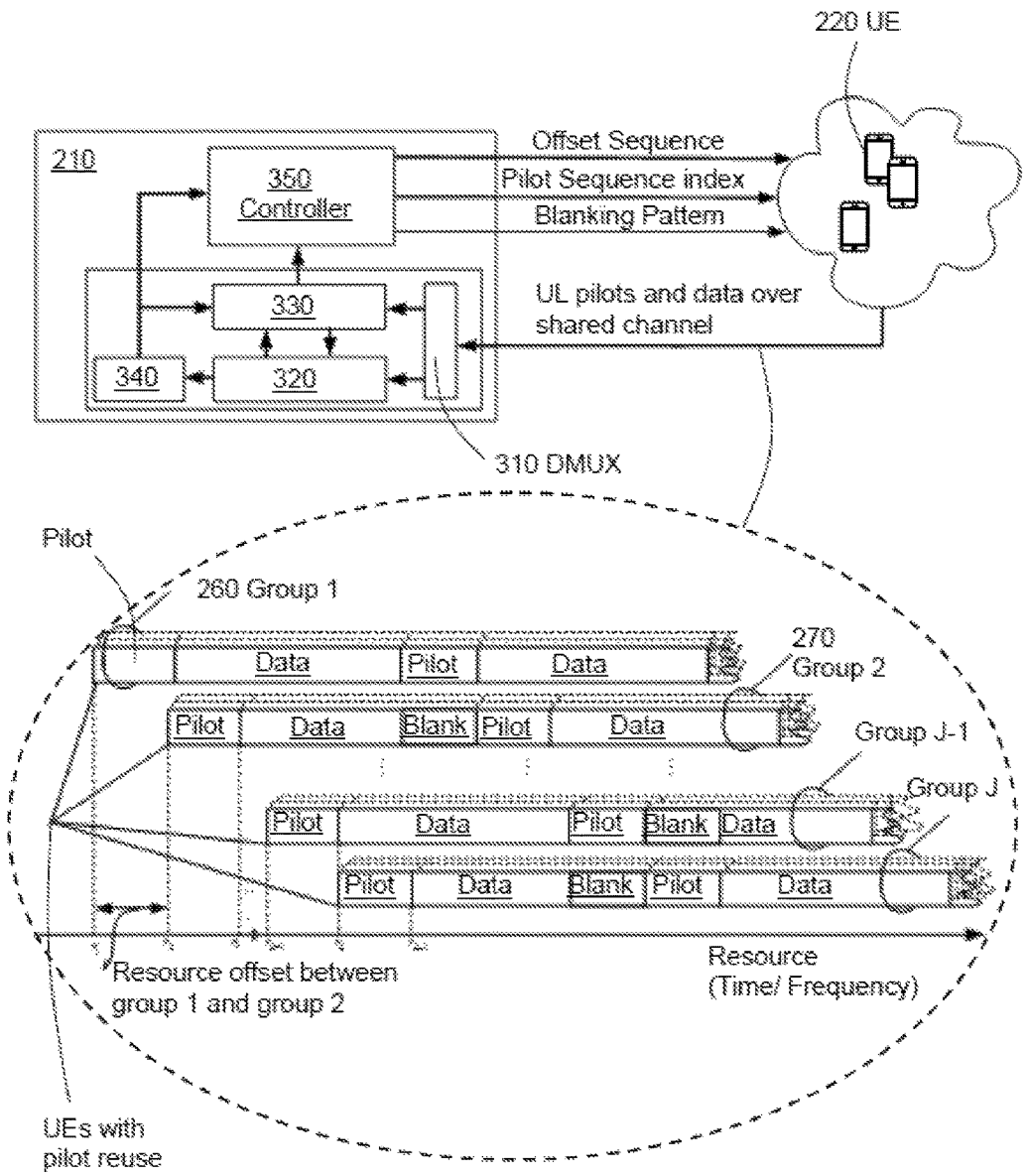
FIG. 3 is a block diagram illustrating multiple access with user grouping according to an embodiment of the invention.

FIG. 3 illustrates an embodiment comprising multiple-access with user grouping for pilot reuse and resource-offset transmission. The time axis indicates the reception time at the receiver side. In some embodiments of the solution, the UEs 220-1, 220-2, 220-3, 220-4 may use partial blanking to control to the quality channel estimation at the receiver side as illustrated in FIG. 3.

The disclosed structure allows reusing the pilot sequences because it avoids pilot contaminations. So for example, if a time interval of length $T_p$ is used for pilot and the total transmission for each subframe is $T_c = T_d + T_p$, where $T_d$ is a transmission time for data, $T_c$ is the coherence time. Then the maximum number of UE groups 260, 270, when timing-offset is used, may be computed as:

$$J = \left\lfloor \frac{T_c}{T_p} \right\rfloor \tag{7}$$

To illustrate the ultimate impact of the disclosed method, consider the case of an access node 210 with an antenna array 240 with very high number of antenna elements 250. For this case, the conventional solution allocates half of the time for training and the remaining time for data transmission in order to maximise the aggregate rate. That is the total number of symbols $n_{sym}$ that can be asymptotically with a negligible error can be detected as the number of antennas increases, is given by:

$$n_{sym} = \frac{1}{4} T_c^2 \tag{8}$$

Figure 4A:
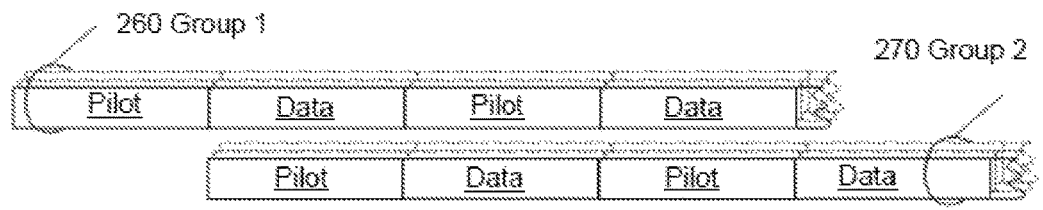
FIG. 4A is a block diagram illustrating two groups scheduling according to an embodiment of the invention.

However, with the new solution according to equation (7), two UE groups 260, 270 with pilot reuse can be scheduled. FIG. 4A illustrates an example of this case with two UE groups 260, 270 where the blanking is not used because for very large arrays the interference cancellation is possible. To decode the information of different UE groups 260, 270 the following sequential channel estimation and decoding may be used. Using the pilots of the first UE group 260, the associated channels are estimated and then the followed data is decoded. The decoded data of the first UE group 260 is fed to the channel estimator subtracted the interference due to the data symbols for the pilots of the second UE group 270. The procedure is then continued iteratively. For a large number of antennas 250, it can be shown that the number of recovered symbols $n_{sym}^{new}$ becomes:

$$n_{sym}^{new} = \frac{1}{2} T_c^2 \tag{9}$$

which indicates 100% increase in the throughput. This gain is also achievable using SOMA. However the presented method performs better than SOMA for a finite number of antennas 250, which will be discussed subsequently.

For a multicarrier system, equation (8) and equation (9) will respectively change to $\frac{1}{4} B_c^2 T_c^2$ and $\frac{1}{2} B_c^2 T_c^2$, where $B_c$ denotes the coherence bandwidth.

Figure 4B:
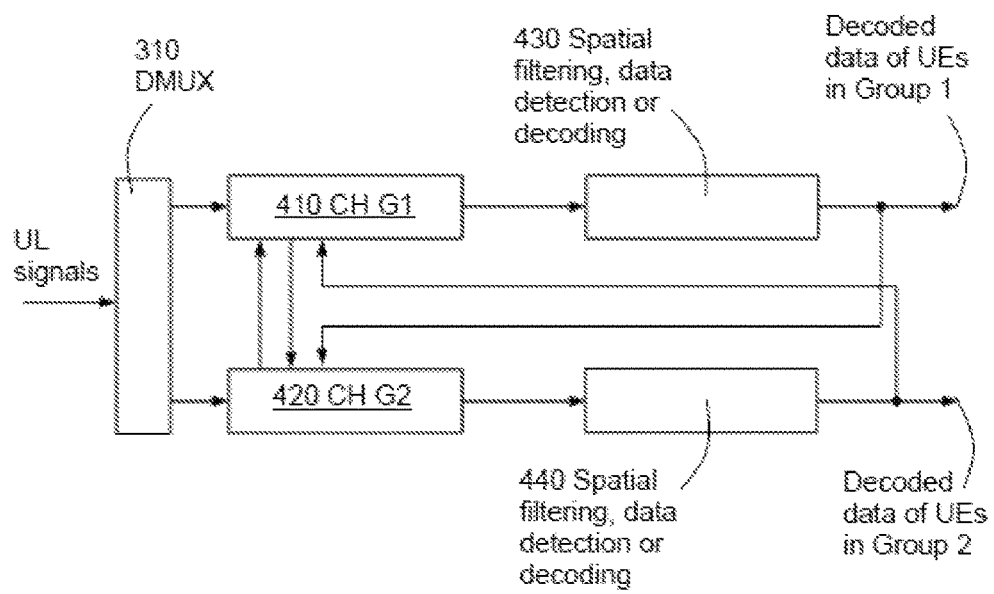
FIG. 4B is a block diagram illustrating a receiver according to an embodiment of the invention.

FIG. 4B illustrates an example of a receiver utilised e.g. in the two UE group case illustrated in FIG. 4A.

Figure 5:
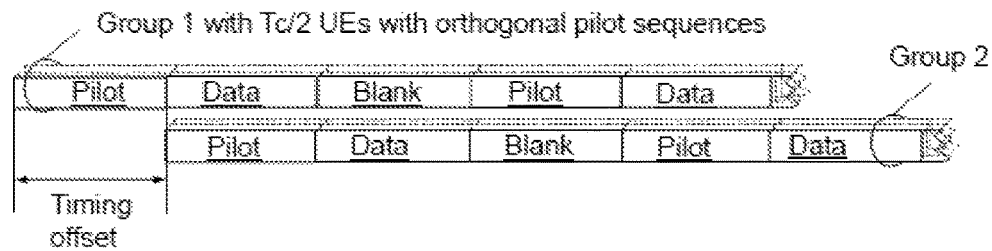
FIG. 5 is a block diagram illustrating two UE groups scheduling according to an embodiment of the invention.

For the case the antenna array 240 comprises not so many antenna elements 250, it may be beneficial to partially blank some part of subframes to enhance the channel estimation and to improve consequently the performance of spatial filtering which in turn enhances the spectral efficiency of the system. FIG. 5 depicts an example. The blanking pattern may be chosen based on the inter-UE interference. For higher interference a blanking pattern with a higher density may be considered. For lower interference, a sparser blanking pattern may be selected. This improves the spectral efficiency of the system 200 in some embodiments.

The quality of channel estimation quality plays a key role on the performance of the system 200. One way to optimise the performance of the system 200 is to perform closed loop power control where the power control is done based on the uplink pilot symbol. For the disclosed construction it is desirable that to have variable average power allocation on the pilot and the data symbols where the power allocation varies over different groups 260, 270. In particular for example in FIG. 4B and FIG. 5, it may be desirable to have higher power allocation on the pilot sequences of the UEs 220-1, 220-2 in the first UE group 260 to allows a higher quality channel estimation which enables an improved detection of the data symbols of the first UE group 260 and also better interference cancellation on the pilot sequences. Note that in order to perform interference cancellation on the pilot sequences of both UE groups 260, 270 it may be required to know both the data symbols and obtain a good estimation of the channels.

In another embodiment, the resource-offset may compromise frequency-offset such that the same principle with the time-offset can be accomplished in frequency domain. That is the resource on the horizontal axis in FIG. 3 is frequency. Thus the grouping for the case of joint time- and frequency-offset can be computed as:

$$J = \left\lfloor \frac{B_c T_c}{T_p} \right\rfloor \tag{10}$$

where $B_c$ denotes coherence bandwidth in number of sub-carrier.

Figure 6A:
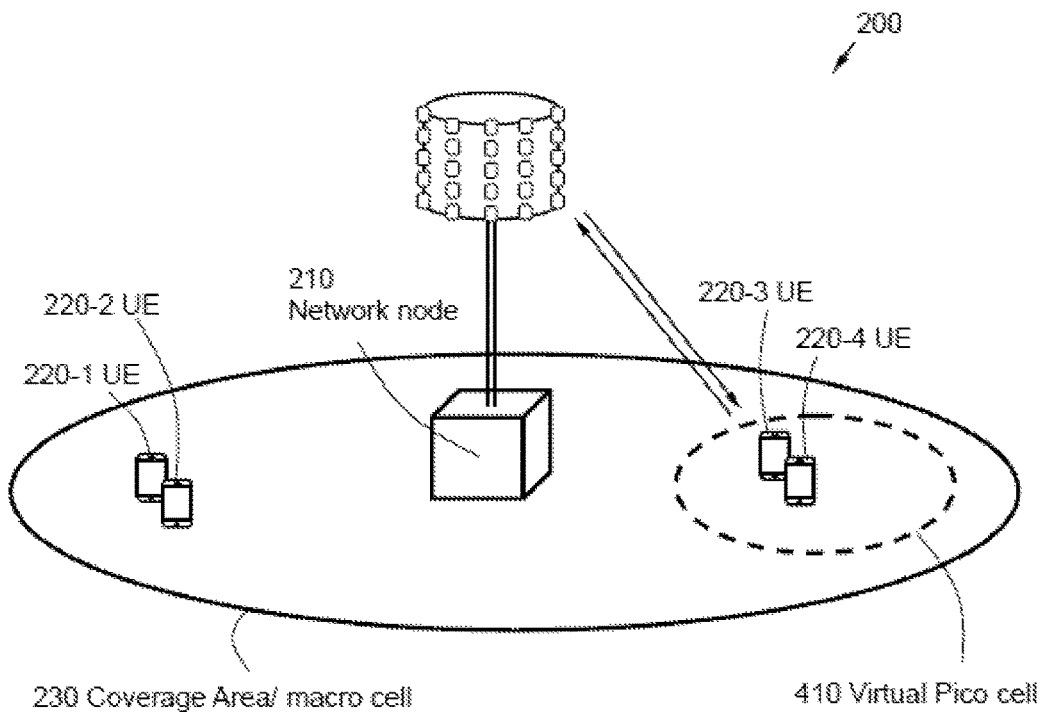
FIG. 6A is a block diagram illustrating a wireless communication network according to some embodiments of the invention.

The main solution in FIG. 3 is constructed by grouping the UEs 220-1, 220-2, 220-3, 220-4. The UE grouping in some scenarios can be done based on the association of UEs 220-1, 220-2, 220-3, 220-4 to cells. The following embodiment of the UE grouping in the main solution is done in the network-level where the UE grouping may amount to a Virtual Heterogeneous Network (vHetNet) as illustrated in FIG. 6A. The reason for virtual HetNet is to avoid backhaul deployments as compared to the conventional deployment. In this example, a virtual pico cell 410 and a macro cell 230 are provided, however, other set-ups may comprise another number of virtual pico cells 410.

Figure 6B:
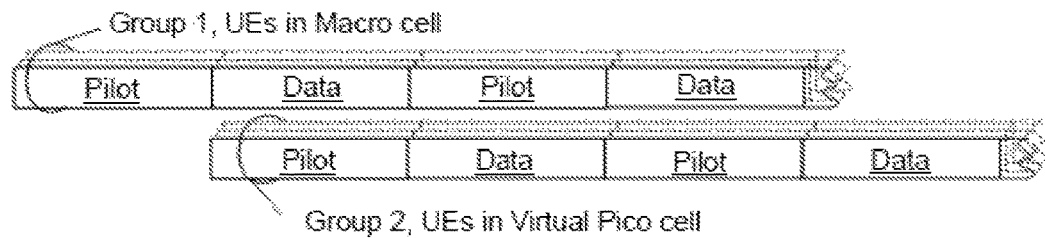
FIG. 6B is a block diagram illustrating UE grouping according to an embodiment of the invention.

An example of the solution is given in FIG. 6B. The disclosed solution may be necessary as for uplink transmission the pilot sequences from the virtual Pico-cells 410 and the Macro cell 230 will interfere with one another. The transmitted uplink reference signals from the Pico cell UEs 220-3, 220-4 and Macro cell UEs 220-1, 220-2 interfere with one another. Hence, the constructed directional beams leak to unwanted UEs due to the pilot contaminations. For the case when the virtual Pico cell 410 and Macro cells 230 have different antenna hardware, a Coordinated Multi-Point (CoMP) transmission can be simply adopted as the associated base stations are collocated.

Hence the receiver in FIG. 6A can be implemented when the first UE group 260 comprises Macro cell UEs 220-1, 220-2 and the second UE group 270 comprises Pico cell UEs 220-3, 220-4.

Further, the aggregate-rate of the scheme over Rayleigh fading radio channels whose coherence time is $T_c$, i.e. the number of symbols for which the channel approximately remains unchanged, may be considered. It is assumed that the average channel gain from each UE 220-1, 220-2, 220-3, 220-4 to the antenna array 240 attached to the access node 210 is normalised to one. The following three solutions are considered and subsequently discussed: a) conventional TDD, b) SOMA, and c) GSOMA with time-offset and partial blanking.

For Conventional TDD, consider the baseline solution using the conventional TDD solution protocol where the number of UEs 220-1, 220-2, 220-3, 220-4 is set to half of the coherence time. The conventional TDD solution with Matched Filtering (MF) and MMSE channel estimation achieves the sum-rate:

$$R^b_{sum,MF} = \frac{1}{2}K\log\left(1 + \frac{(n_t-1)(1-N_e)P_d}{N_0 + N_e P_d + (K-1)P_d}\right) \quad (11)$$

Using Zero-Forcing (ZF) for spatial filtering and MMSE channel estimation, one can prove the following holds $$R^b_{sum,ZF} = \frac{1}{2}K\log\left(1 + \frac{(n_t-K)(1-N_e)P_d}{N_0 + KN_e P_d}\right) \quad (12)$$

wherein $n_t$ is the number of antennas. $P_d$, $N_0$ and $N_e$ in equations (11)-(12) respectively denote the data transmit power, the variance of AWGN, and the variance of the channel estimation error at which is given by:

$$N_e = \frac{N_0}{N_0 + P_p} \quad (13)$$

where $P_p$ denotes pilot transmit power. Next consider the SOMA scheme that provides the following sum-rate:

$$R^b_{SOMA} = \frac{1}{N}\sum_{k=1}^{N-1} \quad (14)$$

$$\left\{\begin{array}{l}\log\left(1 + \dfrac{P_k}{\dfrac{(1-N_{e_k})^{-1}}{n_t-1}N_0 + \dfrac{(1-N_{e_k})^{-1}}{n_t-1}N_{e_k}P_k + \dfrac{(1-N_{e_k})^{-1}}{n_t-1}\sum_{i=1,i\neq k}^{l-1}P_i}\right) + \\ \sum_{l=k+1}^{N-1}\log\left(1 + \dfrac{P_k}{\dfrac{(1-N_{e_k})^{-1}}{n_t-1}N_0 + \dfrac{(1-N_{e_k})^{-1}}{n_t-1}N_{e_k}P_k + \dfrac{(1-N_{e_k})^{-1}}{n_t-1}P_{pl} + \dfrac{(1-N_{e_k})^{-1}}{n_t-1}\sum_{i=1,i\neq k}^{l-1}P_i}\right)\end{array}\right\}$$

where:

$$N_{e_k} = \frac{N_0 + \sum_{j=1}^{k}N_{e_j}P_j}{N_0 + P_{pk} + \sum_{j=1}^{k}N_{e_j}P_j} \quad (15)$$

and $N=T_c B_c$ denotes the length of the coherence interval, $P_k$ and $P_{pk}$ respectively denote the data and pilot transmit power of user k, wherein $P_j$ represents the data of user j.

Finally, an embodiment comprising GSOMA with Time-offset and Blanking may be discussed. Consider the transmission protocol illustrated in FIG. 5 wherein the uplink transmission with multiple subframes is considered. There are two UE groups 260, 270, i.e. J=2, such that each UE group 260, 270 comprises K=½T$_c$ UEs 220-1, 220-2, 220-3, 220-4. The UEs 220-1, 220-2, 220-3, 220-4 in each UE group 260, 270 are transmitting with orthogonal pilots while the pilot sequences in the second UE group 270 are completely reused by the UEs 220-3, 220-4 of the second UE group 270. The UEs 220-1, 220-2, 220-3, 220-4 employ partial blanking, the blanking pattern is signalled by the access node 210, and it is designed such that the pilots of the first group do not receive any interference at all and the channel estimation for the UEs 220-1, 220-2 in the first UE group 260 does not degrade with respect to the baseline. The blanking pattern in this example has the granularity of half of the subframe length which is equal to the portion of pilot region. However the pilot sequences of the second UE group 270 are concurrently received as the data of the first UE group 260. The disclosed embodiment according to FIG. 5, with Matched Filtering for spatial filtering and MMSE channel estimation achieves the sum-rate:

$$R^{new}_{sum,MF} = \frac{1}{3}K\log\left(1 + \frac{(n_t-1)(1-N_{e1})P_{d1}}{N_0 + N_{e1}P_{d1}P_{p2} + (K-1)P_{d1}}\right) + \quad (16)$$
$$\frac{1}{3}K\log\left(1 + \frac{(n_t-1)(1-N_{e2})P_{d2}}{N_0 + N_{e2} + P_{d2} + (K-1)P_{d2}}\right)$$

and using Zero-Forcing spatial filtering and MMSE channel estimation achieves the sum-rate:

$$R^{new}_{sum,ZF} = \frac{1}{3}K\log\left(1 + \frac{(n_t-K)(1-N_{e1})P_{d1}}{N_0 + KN_{e2} + P_{p2}}\right) + \quad (17)$$
$$\frac{1}{3}K\log\left(1 + \frac{(n_t-K)(1-N_{e2})P_{d2}}{N_0 + KN_{e2}}\right)$$

where $P_{d,j}$, $P_{p,j}$, $N_{e,j}$, denotes the data transmit power, pilot transmit power, and the variance of channel estimation error for the UEs 220-1, 220-2, 220-3, 220-4 in UE group j=1, 2 and $$N_{e,1} = \frac{N_0}{N_0 + P_{p1}} \quad (18)$$

$$N_{e,2} = \frac{N_0 + KN_{e1}P_{d1}}{N_0 + KN_{e1}P_{d1} + P_{p2}}$$

Subsequently, a proof of the sum-rate with Matched Filtering will be outlined to further clarify some aspects of the described embodiments of the solution. In this example, there are two UE groups 260, 270 of UEs 220-1, 220-2, 220-3, 220-4. The pilot sequences of the UEs 220-1, 220-2 in the first UE group 260 are mutually orthogonal hence the receiver can perform channel estimation for each UE 220-1, 220-2 in the UE group 260 independently and without interference. Without loss of generality, consider the first UE 220-1 in the first UE group 260. Then the received pilot sequence is given by:

$$y_{p1} = h_{11}x_{p11} + z_{p,1} \quad (19)$$

where $h_{11}$ is the channel vector of the first UE 220-1 in the first UE group 260 to the antenna array 240 with $n_t$ antenna elements 250, and $x_{p11}$ is the pilot symbol transmitted from the first UE 220-1 in the first UE group 260 and $z_{p1}$ is the AWGN noise vector with $n_t$ antenna elements 250 at the antenna array 240. Over the first time-frequency resource element the other UEs 220-2 are silent and the first channel estimator can estimate the channel vector $h_{11}$ without any interference. The estimated channel vector can be written as $\hat{h}_{11} = h_{11} + z_{e11}$, where $z_{e11}$ denotes the channel estimation error vector. With the MMSE channel estimation, each element of the channel estimation error vector has the variance equal to $$N_{e,1} = \frac{N_0}{N_0 + P_{p1}} \quad (20)$$

where $N_0$ denotes the variance of AWGN and $P_{p1}$ is the power of the pilot sequence transmitted from the first UE 220-1 in the first UE group 260.

The received data signal over ith time-frequency resource element is given by:

$$y_i = \underbrace{h_{11}x_{d11,i}}_{\text{desired information}} + \underbrace{\sum_{j=2}^{K-1} h_{j1}x_{dj1,i}}_{\substack{\text{interference from other UEs} \\ \text{in the first UE group}}} + \underbrace{h_{i2}x_{pi2}}_{\substack{\text{pilot sequence of the corresponding} \\ \text{UE in the second UE grouop}}} + \underbrace{z_i}_{AWGN} \quad (21)$$

where $h_{ij}$ denotes the channel vector of UE i of group j, $x_{dj1,i}$ denotes the data symbol transmitted from UE j in the first UE group 260 over the ith time-frequency resource element, j=1, 2, . . . , k and $x_{pi2}$ denotes the pilot of the 220-3, 220-4 of the second UE group 270 that is transmitted in ith time-frequency resource element and $z_i$ denotes AWGN at the receiver for ith time-frequency resource element. Next the receiver using the estimated channel vector of the first user, $\hat{h}_{11} = h_{11} + z_{e11}$, where $z_{e11}$ is channel estimation error, obtained via the signal vector $y_{p1}$, can perform the normalised matched filtering for $2 \leq i \leq N$, as follows:

$$\tilde{y}_i = \frac{1}{\|\hat{h}_{11}\|}\hat{h}_{11}^\dagger y_i = \underbrace{\|\hat{h}_{11}\|x_{d11,i}}_{\substack{\text{Information of the first UE in the first UE group} \\ \text{over the ith channel use}}} + \quad (22)$$

$$\underbrace{\frac{1}{\|\hat{h}_{11}\|}\hat{h}_{11}^\dagger h_{i2}x_{p2i}}_{\substack{\text{Interference due the} \\ \text{pilot of ith UE in the second UE group}}} + \underbrace{\frac{1}{\|\hat{h}_{11}\|}\sum_{j=2}^{K-1}\hat{h}_{11}^\dagger h_{j1}x_{dj1,i}}_{\substack{\text{Interference due to other} \\ \text{UEs' data in the first UE group}}} +$$

$$\underbrace{\frac{1}{\|\hat{h}_{11}\|}\hat{h}_{11}^\dagger z_i}_{AWGN} + \underbrace{\frac{1}{\|\hat{h}_{11}\|}\hat{h}_{11}^\dagger z_{e11}x_{d1,i}}_{\substack{\text{Propagation of the channel} \\ \text{estimation error}}}$$

where $\hat{h}_{11}^\dagger$ denotes the Hermitian transpose of $\hat{h}_{11}$. It may be noted that the variable $\|\hat{h}_{11}\|x_{d11,i}$ is uncorrelated to the remaining terms in equation (22). Hence, by using the fact that the worst uncorrelated noise is Gaussian, and repeating this procedure for all UEs 220-1, 220-2 in the first UE group 260, the following sum-rate for the first group becomes achievable:

$$R_{\Sigma 1} = \sum_{k=1}^{K} R_{k1} \quad (23)$$

$$= \frac{1}{3}K\mathbb{E}\log\left(1 + \frac{\|\hat{h}_{11}\|^2 P_{d1}}{N_0 + N_{e1}P_{d1} + P_{p2} + (K-1)P_{d1}}\right)$$

$$= \frac{1}{3}K\mathbb{E}\log\left(1 + \frac{P_{d1}}{\frac{1}{\|\hat{h}_{11}\|^2}(N_0 + N_{e1}P_{d1} + P_{d2} + (K-1)P_{d1})}\right)$$

$$\geq \frac{1}{3}K\log\left(1 + \frac{P_{d1}}{\mathbb{E}\left[\frac{1}{\|\hat{h}_{11}\|^2}\right](N_0 + N_{e1}P_{d1} + P_{p2} + (K-1)P_{d1})}\right)$$

$$= \frac{1}{3}K\log\left(1 + \frac{(n_t - 1)(1 - N_{e1})P_{d1}}{N_0 + N_{e1}P_{d1} + P_{p2} + (K-1)P_{d1}}\right)$$

where $R_{k1}$ denotes the transmission rate of user k in the first group, the inequality follows by Jensen inequality and the last equality holds because of the properties of inverse-Wishart distribution.

Further, the second UE group 270 may be considered. The receiver first needs to estimate the channel of the UEs 220-3, 220-4 of the second UE group 270. The UEs 220-3, 220-4 in the second UE group 270 transmit the corresponding pilot sequences concurrently with the data symbols of all UEs 220-1, 220-2 in the first UE group 260. Consider the received signal:

$$\tilde{y}_i = \underbrace{h_{i2}x_{pi2}}_{\substack{\text{pilot sequence of the first UE} \\ \text{in the second UE group}}} + \underbrace{\sum_{j=1}^{K} h_{j1}x_{dj1,i}}_{\substack{\text{interference from all UEs} \\ \text{in the first UE group}}} + \underbrace{z_i}_{AWGN} \quad (24)$$

that comprises the pilot sequence of the first UE 220-3 in the second UE group 270. The received noisy pilot sequence associated the corresponding UE 220-3 is interfered by the data symbols $x_{dj1,i}$ for all UEs $1 \leq j \leq K$ in the first UE group 260. However these data symbols are previously decoded and the associated channels are also estimated as $\hat{h}_{j1}$. Thus the receiver can perform an interference cancellation as follows to obtain the processed signal $\tilde{y}_i$:

$$\tilde{y}_i = \underbrace{y_i \sum_{j=1}^{K} h_{j1} x_{dj1,i}}_{\text{estimated interference from all UEs in the first UE group}} = \underbrace{\hat{h}_{i2} x_{pi2}}_{\substack{\text{pilot symbol of the first UE} \\ \text{in the second UE group}}} + \tag{25}$$

$$\underbrace{z_i}_{AWGN} - \underbrace{\sum_{j=1}^{K} \hat{z}_{e,j1} x_{dj1,i}}_{\substack{\text{propagation of channel} \\ \text{estimation error after interference cancellation}}}$$

The estimated channel vector obtained via $\tilde{y}_i$ can be written as $\hat{h}_{i2} = h_{i2} + z_{e_{i2}}$, where $z_{e_{i2}}$ denotes the channel estimation error vector. With the MMSE channel estimation, each element of the channel estimation error vector has the variance equal to:

$$N_{e2} = \frac{N_0 + KN_{e1}P_{d1}}{N_0 + KN_{e1}P_{d1} + P_{p2}} \tag{26}$$

where $N_0$ denotes the variance of AWGN and $P_{p2}$ is the power of the pilot sequence transmitted from the UE 220-3, 220-4 in the second UE group 270. Now using the estimated channels $\hat{h}_{i2}$, the receiver performs Matched Filtering filtering for the signals that carry the information of the UE 220-3, 220-4 in the second UE group 270. Toward this end, consider the first UE 220-3 in the second UE group 270. The received data over ith time-frequency resource element is given by:

$$y_i = \underbrace{h_{12} x_{d12,i}}_{\text{desired information}} + \underbrace{\sum_{j=2}^{K-1} h_{j1} x_{dj2,i}}_{\substack{\text{interference from all UEs} \\ \text{in the first UE group}}} + \underbrace{z_i}_{AWGN} \tag{27}$$

where $x_{dj2,i}$ denotes the data symbol transmitted from UE j in the second UE group 270 over the ith time-frequency resource element. Next the receiver using the estimated channel vector, $\hat{h}_{12} = h_{12} + z_{e_{12}}$, of the first UE 220-3 in the second UE group 270 performs the normalised matched filtering as follows to obtain the processed signal $\tilde{y}_i$:

$$\tilde{y}_i = \frac{1}{\|\hat{h}_{12}\|} \hat{h}_{12}^{\dagger} y_i = \underbrace{\|\hat{h}_{12}\| x_{d12,i}}_{\substack{\text{Information of the first UE in the first UE group} \\ \text{over the ith channel use}}} + \tag{28}$$

$$\underbrace{\frac{1}{\|\hat{h}_{12}\|} \sum_{j=2}^{K-1} \hat{h}_{12}^{\dagger} h_{j2} x_{dj1,i}}_{\substack{\text{Interference from all UEs} \\ \text{UEs' data in the second UE group}}} + \underbrace{\frac{1}{\|\hat{h}_{12}\|} \hat{h}_{12}^{\dagger} z_i}_{AWGN} + \underbrace{\frac{1}{\|\hat{h}_{12}\|} \hat{h}_{12}^{\dagger} z_{e12} x_{d12,i}}_{\substack{\text{Propagation of the channel} \\ \text{estimation error}}}$$

Note that the desired variable $\|\hat{h}_{11}\| x_{d11,i}$ is uncorrelated to the remaining terms in (28). Hence, by using the fact that the worst uncorrelated noise is Gaussian, and repeating this procedure for all UEs 220-3, 220-4 in the second UE group 270, then the following rate becomes achievable:

$$R_{\Sigma 2} = \sum_{k=1}^{K} R_{k2} \tag{29}$$

$$= \frac{1}{3} K \mathbb{E} \log \left( 1 + \frac{\|\hat{h}_{12}\|^2 P_{d2}}{N_0 + N_{e2} P_{d2} + (K-1) P_{d2}} \right)$$

$$= \frac{1}{3} K \mathbb{E} \log \left( 1 + \frac{P_{d2}}{\frac{1}{\|\hat{h}_{12}\|^2} (N_0 + N_{e2} P_{d2} + (K-1) P_{d2})} \right)$$

$$\geq \frac{1}{3} K \log \left( 1 + \frac{P_{d2}}{\mathbb{E}\left[\frac{1}{\|\hat{h}_{12}\|^2}\right] (N_0 + N_{e2} P_{d2} + (K-1) P_{d2})} \right)$$

$$= \frac{1}{3} K \log \left( 1 + \frac{(n_t - 1)(1 - N_{e2}) P_{d2}}{N_0 + N_{e2} P_{d2} + (K-1) P_{d2}} \right)$$

Where $R_{k2}$ denotes the transmission rate of user k in the second group, the first inequality similarly follows by Jensen inequality and the last equality holds because of the properties of inverse-Wishart distribution. Now the summation of the rates of all UEs 220-1, 220-2, 220-3, 220-4 in both UE groups 260, 270 gives the following achievable sum-rate:

$$R_{sum,MF}^{new} = R_{\Sigma 1} + R_{\Sigma 2} \tag{30}$$

$$= \frac{1}{3} K \log \left( 1 + \frac{(n_t - 1)(1 - N_{e1}) P_{d1}}{N_0 + N_{e1} P_{d1} + P_{d2} + (K-1) P_{d1}} \right) +$$

$$\frac{1}{3} K \log \left( 1 + \frac{(n_t - 1)(1 - N_{e2}) P_{d2}}{N_0 + N_{e2} P_{d2} + (K-1) P_{d2}} \right)$$

Furthermore, a proof of the sum-rate obtained by Zero-Forcing will be outlined. There are two UE groups 260, 270 of UEs 220-1, 220-2, 220-3, 220-4 in this arbitrary example. The pilot sequences in the first UE group 260 are orthogonal so the receiver can estimate the channels of all UEs 220-1, 220-2 prior to the spatial filtering. The estimated channels can be written in a matrix according as:

$$\hat{H}_1 = \underbrace{[h_{11} \; \cdots \; h_{1K}]}_{H_1} + \underbrace{[z_{e,11} \; \cdots \; z_{e,1K}]}_{Z_{e1}} \tag{31}$$

where ith column of $H_1$ and $Z_{e1}$ respectively denote the channel vector and the channel estimation error of ith UE of the first UE group 260 to the antenna array. Using the estimated channel matrix $\hat{H}_1$, the receiver forms the zero-forcing matrix given as:

$$W_{ZF,1} = \hat{H}_1 (\hat{H}_1^{\dagger} \hat{H}_1)^{-1} \tag{32}$$

Using the constructed spatial filter $W_{ZF}$, the receiver obtains the signal vector:

$$\tilde{y}_i = W_{ZF,1}^{\dagger} y_i \tag{33}$$

$$= (\hat{H}_1^{\dagger} \hat{H}_1)^{-1} \hat{H}_1^{\dagger} y_i$$

-continued $$= (\hat{H}_1^\dagger \hat{H}_1)^{-1} \hat{H}_1^\dagger \left( \begin{bmatrix} \hat{h}_{11} & \cdots & \hat{h}_{1K} \end{bmatrix} \begin{bmatrix} x_{d11,i} \\ x_{d12,i} \\ \vdots \\ x_{d1K,i} \end{bmatrix} + h_{i2}x_{p2i} + z_i - \sum_{j=1}^{K} z_{ej1} x_{dj1,i} \right)$$

$$= \begin{bmatrix} x_{d11,i} \\ x_{d12,i} \\ \vdots \\ x_{d1K,i} \end{bmatrix} + W_{ZF,1}^\dagger \left( h_{i2} x_{p2i} + z_i - \sum_{j=1}^{K} z_{ej1} x_{dj1,i} \right)$$

From equation (33), it is seen that the spatial Zero-Forcing filtering orthogonalises (i.e. zero-forces) the interference of the other UEs 220-1, 220-2, 220-3, 220-4. Considering the first element of $\tilde{y}_i$:

$$\tilde{y}_{1i} = \underbrace{x_{d11,i}}_{\text{Information of first UE in the first UE group over the ith channel use}} + \tag{34}$$

$$\underbrace{\hat{w}_1^\dagger h_{i2} x_{p2i}}_{\substack{\text{Interference due the} \\ \text{pilot of ith UE in the second UE group}}} - \underbrace{\sum_{j=1}^{K} \hat{w}_1^\dagger z_{ej1} x_{dj1,i}}_{\text{Propagation of the channel estimation error}} + \underbrace{\hat{w}_1^\dagger z_i}_{\text{AWGN}}$$

Again it may be noted that $\|\hat{w}_{11}\|^2 x_{d11,i}$ is uncorrelated with the remaining variables in equation (34). Then evoking the fact that the worst uncorrelated noise is Gaussian, the following rate is achievable:

$$R_{\Sigma 1} = \sum_{k=1}^{K} R_{k1} \tag{35}$$

$$= \frac{1}{3} \sum_{k=1}^{K} \mathbb{E} \log \left( 1 + \frac{P_{d1}}{\|\hat{w}_k\|^2 (N_0 + KN_{e1}P_{d1} + P_{p2})} \right)$$

$$\geq \frac{1}{3} \sum_{k=1}^{K} \log \left( 1 + \frac{P_{d1}}{\mathbb{E}[\|\hat{w}_k\|^2](N_0 + KN_{e1}P_{d1} + P_{p2})} \right)$$

$$= \frac{1}{3} \sum_{k=1}^{K} \log \left( 1 + \frac{P_{d1}}{\mathbb{E}\left\{ \left[ (\hat{H}_1^\dagger \hat{H}_1)^{-1} \right]_{kk} \right\} (N_0 + KN_{e1}P_{d1} + P_{p2})} \right)$$

$$= \frac{1}{3} K \log \left( 1 + \frac{(n_t - 1)(1 - N_{e1})P_{d1}}{N_0 + KN_{e1}P_{d1} + P_{p2}} \right)$$

where the first inequality similarly follows by Jensen inequality and the last equality holds because of the properties on inverse-Wishart distribution.

Further, the second UE group 270 may be considered. The receiver first estimates all channels of the UEs 220-3, 220-4 of the second UE group 270. This can be done in a similar fashion as has already been illustrated in the previous example, using the same interference cancellation procedure as described in equation (25). Having estimated channels of all UEs 220-3, 220-4 in the second UE group 270, the receiver then performs Zero-Forcing using the estimated channel vectors. By following the same procedure as that for the first UE group 260 outlined in equations (31)-(35), the sum-rate for the second UE group 270 is given by:

$$R_{\Sigma 2} = \frac{1}{3} K \log \left( 1 + \frac{(n_t - K)(1 - N_{e2})P_{d2}}{N_0 + KN_{e2}P_{d2}} \right) \tag{36}$$

where $$N_{e,2} = \frac{N_0 + KN_{e1}P_{d1}}{N_0 + KN_{e1}P_{d1} + P_{p2}} \tag{37}$$

Finally, the sum-rate of all UEs 220-1, 220-2, 220-3, 220-4 in both UE groups 260, 270 can be found to be:

$$R_{sum,ZF}^{new} = \frac{1}{3} K \log \left( 1 + \frac{(n_t - K)(1 - N_{e1})P_{d1}}{N_0 + KN_{e2} + P_{p2}} \right) + \tag{38}$$

$$\frac{1}{3} K \log \left( 1 + \frac{(n_t - K)(1 - N_{e2})P_{d2}}{N_0 + KN_{e2}} \right)$$

Figure 7:
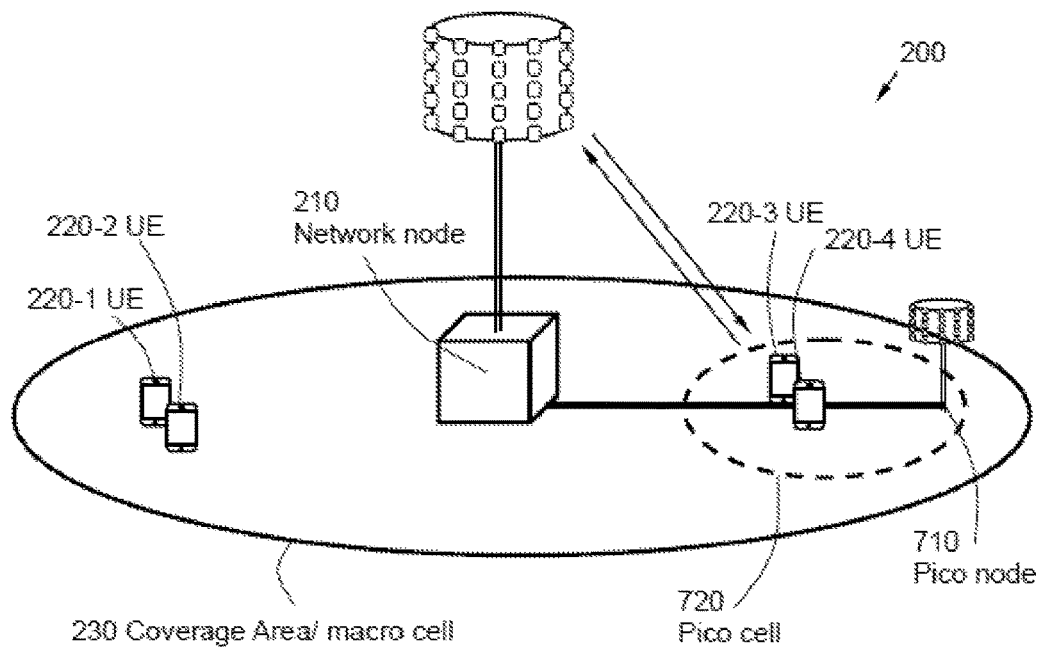
FIG. 7 is a block diagram illustrating a wireless communication network according to some embodiments of the invention.

FIG. 7 illustrates yet a Hetnet scenario, similar to the virtual Hetnet depicted in FIG. 6A. However, the system 200 here comprises a pico node 710, forming a pico cell 720. The pico node 710 is connected to the network node 210 via a backhaul link, which may be wired or wireless in different embodiments. However, other set-ups may comprise another number of pico nodes 710 and pico cells 720.

In some embodiments, UEs 220-1, 220-2 situated in the macro cell 230, served by network node 210 may be grouped together in one group, e.g. the first UE group 260 while UEs 220-3, 220-4 served by the pico node 710 may be grouped in the second group 250 etc.

Figure 8:
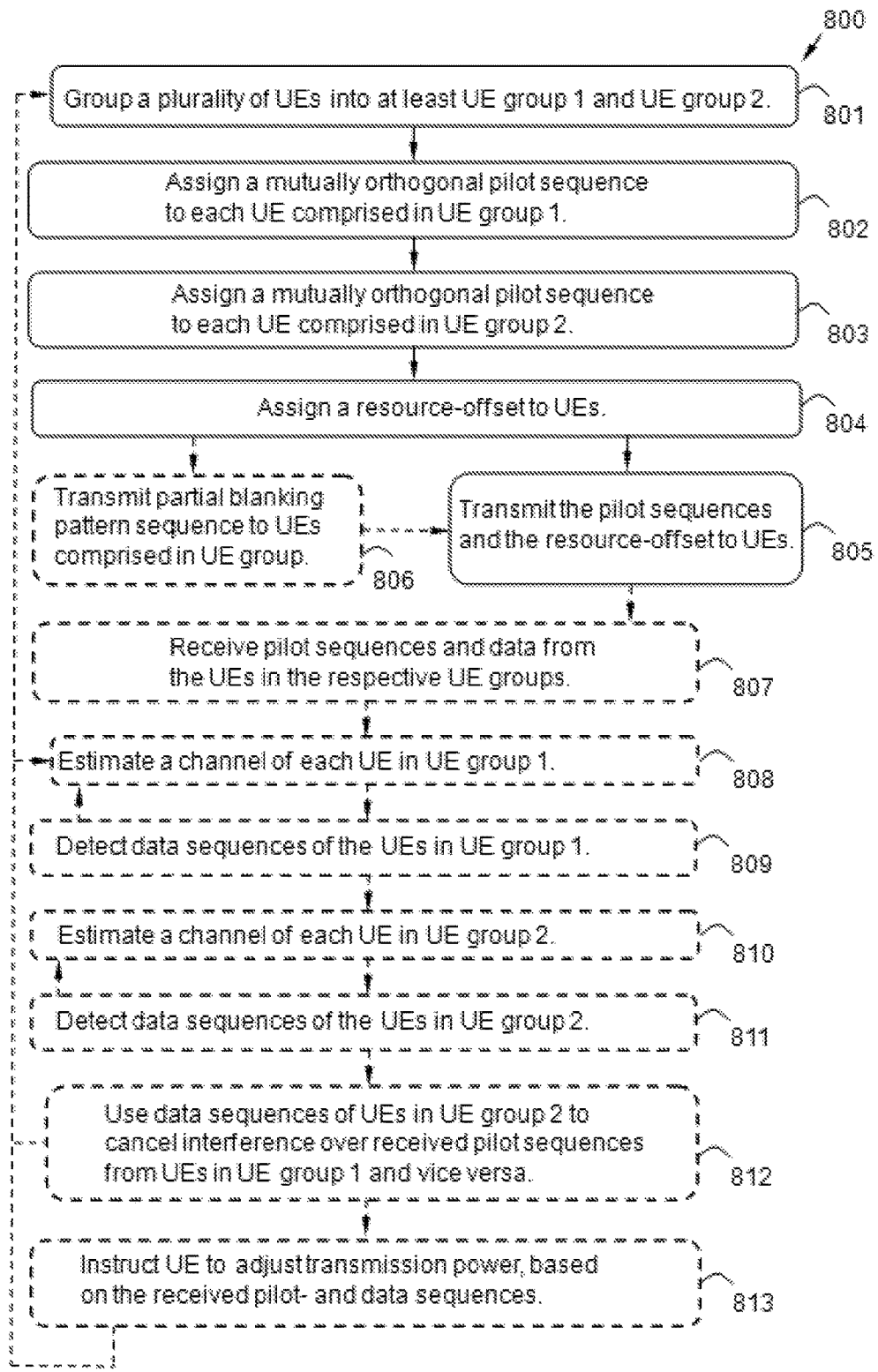
FIG. 8 is a flow chart illustrating a method in a network node according to an embodiment of the invention.

FIG. 8 is a flow chart illustrating embodiments of a method 800 in network node 210. The method 800 concerns wireless communication with a plurality of UEs 220-1, 220-2, 220-3, 220-4 in a wireless communication system 200, wherein the UEs 220-1, 220-2, 220-3, 220-4 are grouped together in at least two UE groups 260, 270. The network node 210 comprises, or is connectable to; a plurality of antenna elements 250, forming a multiple antenna array 240 which may be configured for massive Multiple-Input Multiple-Output (MIMO) transmission.

The multiple antenna array 240 comprises a multitude of antenna elements 250, such as e.g. hundred or more antenna elements 250 in some embodiments. The wireless communication system 200 thus may be configured for massive MIMO, according to some embodiments. The multitude of antenna elements may in some embodiments be mounted at a distance from each other, within the multiple antenna array 240, such that some, several or even all of the antenna elements 250 may be able to receive/transmit the same signal from/to the UEs 220-1, 220-2, 220-3, 220-4.

The wireless communication network 200 may be based on 3GPP LTE. Further, the wireless communication system 200 may be based on FDD or TDD in different embodiments. The network node 210 may comprise an eNodeB according to some embodiments.

To appropriately communicate with the UEs 220-1, 220-2, 220-3, 220-4, the method 500 may comprise a number of actions 801-813.

It is however to be noted that any, some or all of the described actions 801-813, may be performed in a somewhat different chronological order than the enumeration indicates, be performed simultaneously or even be performed in a completely reversed order according to different embodiments. Some of the actions 801-813, such as the actions 806-813 may be performed only in some alternative embodiments. Further, it is to be noted that some actions may be performed in a plurality of alternative manners according to different embodiments, and that some such alternative manners may be performed only within some, but not necessarily all embodiments. The method 800 may comprise the following actions:

Action 801

A plurality of UEs 220-1, 220-2, 220-3, 220-4 are grouped into at least a first UE group 260 and a second UE group 270.

The total number of UEs 220-1, 220-2, 220-3, 220-4 may be any arbitrary integer >1. Also the number of UE groups 260, 270 may be any arbitrary integer >1. The number of UEs 220-1, 220-2, 220-3, 220-4 grouped in each of the UE groups 260, 270 may be any arbitrary integer >1.

The grouping of the plurality of UEs 220-1, 220-2, 220-3, 220-4 into any of at least a first UE group 260 and a second UE group 270, may in some embodiments be based on cell location of each UE 220-1, 220-2, 220-3, 220-4.

In some embodiments, the UEs 220-1, 220-2 situated within a Macro cell 230 may be grouped in the first UE group 260, and UEs 220-3, 220-4 situated within a virtual Pico cell 410 may be grouped in the second UE group 270.

Furthermore, the grouping of the UEs 220-1, 220-2, 220-3, 220-4, based on received signal strength, wherein UEs 220-1, 220-2, 220-3, 220-4 associated with a received signal strength lower than a threshold value may be grouped in the first UE group 260 while UEs 220-1, 220-2, 220-3, 220-4 associated with a received signal strength exceeding the threshold value may be grouped in the second UE group 270.

Action 802

A mutually orthogonal pilot sequence is assigned to each UE 220-1, 220-2 comprised in the first UE group 260.

Pilot sequences of mutually orthogonal pilot sequences may be assigned to the UEs 220-1, 220-2 grouped 801 in the first UE group 260 which are reusable by UEs 220-3, 220-4 grouped 801 in the second UE group 270 in some embodiments.

Action 803

A mutually orthogonal pilot sequence is assigned to each UE 220-3, 220-4 comprised in the second UE group 270.

Pilot sequences of mutually orthogonal pilot sequences may be assigned to the UEs 220-3, 220-4 grouped 801 in the second UE group 270, which are reusable by UEs 220-1, 220-2 in the first UE group 260.

Action 804

A resource-offset is assigned to the UEs 220-1, 220-2, 220-3, 220-4 comprised in each UE group 260, 270, by which each UE 220-1, 220-2, 220-3, 220-4 is allowed to start its transmission sub-frame in its Transmission Time Interval (TTI).

The first resource-offset sequences may be selected such that the received pilot sequences of UEs 220-1, 220-2 in the first UE group 260 are not interfered by signals transmitted from the UEs 220-3, 220-4 in the second UE group 270 while the pilot sequences of UEs 220-3, 220-4 in the second UE group 270 are received concurrently with the data of the UEs 220-1, 220-2 in the first UE group 260 and any other pilot sequence which is orthogonal to the pilot sequences of the UEs 220-3, 220-4 in the second UE group 270, in some embodiments.

Action 805

The assigned 802, 803 pilot sequences and the assigned 804 resource-offset are transmitted to UEs 220-1, 220-2, 220-3, 220-4.

Action 806

This action may be performed only in some alternative embodiments.

A partial blanking pattern sequence may be transmitted to UEs 220-1, 220-2, 220-3, 220-4 comprised in at least one of the UE groups 260, 270.

The partial blanking pattern of the UEs 220-1, 220-2 in the first UE group 260 may have a granularity equal to the portion of the pilot region of UEs 220-3, 220-4 comprised in other UE groups 270, for reducing interference among the pilot and data sequences, and vice versa.

Action 807

This action may be performed only in some alternative embodiments.

Pilot sequences and data sequences may be received from the UEs 220-1, 220-2, 220-3, 220-4 in the respective UE groups 260, 270.

Pilot sequences and/or data sequences may be received from the UEs 220-1, 220-2, 220-3, 220-4 in the respective UE groups 260, 270 over a shared uplink channel.

Action 808

This action may be performed only in some alternative embodiments.

A channel of each UE 220-1, 220-2 in the first UE group 260 may be estimated.

A respective channel of each UE 220-1, 220-2 in the first UE group 260 may be estimated, based on the received 805 orthogonal pilot sequences from UEs 220-1, 220-2 in the first UE group 260.

Action 809

This action may be performed only in some alternative embodiments.

Data sequences of the UEs 220-1, 220-2 in the first UE group 260 may be detected.

Data sequences of the UEs 220-1, 220-2 in the first UE group 260 may be detected, which may be used to cancel interference over the received 805 pilot sequences of UEs 220-3, 220-4 in the second UE group 270.

Action 810

This action may be performed only in some alternative embodiments.

A channel of each UE 220-3, 220-4 in the second UE group 270 may be estimated.

Action 811

This action may be performed only in some alternative embodiments.

Data sequences of the UEs 220-3, 220-4 in the second UE group 270 may be detected.

The data sequences of the UEs 220-3, 220-4 in the second UE group 270 may be detected, which may be used to cancel interference over the received 805 pilot sequences of UEs 220 in the first UE group 260.

Action 812

This action may be performed only in some alternative embodiments.

Use data sequences of UEs 220-3, 220-4 in the second UE group 270 to cancel interference over received pilot sequences from the UEs 220-1, 220-2 in the first UE group 260, and vice versa, i.e. data sequences of the UEs 220-1, 220-2 in the first UE group 260 may be used to cancel interference over the received 805 pilot sequences of UEs 220-3, 220-4 in the second UE group 270.

This action may be performed before action 810 in some embodiments.

Action 813

This action may be performed only in some alternative embodiments.

The UEs 220-1, 220-2, 220-3, 220-4 may be instructed to adjust transmission power, based on the inter-group interference between the pilot and data symbol sequences and quality of the channel estimation.

Further, some embodiments may comprise updating the grouping 801, the assigned 802, 803 pilot sequences, the assigned 804 resource-offset sequences or the transmitted 806 partial blanking pattern sequences, which may be signalled to the UEs 220-1, 220-2, 220-3, 220-4, based on UE mobility, channel conditions, active number of UEs within range and transmission load.

Some embodiments may comprise coordinating reception and transmission at a plurality of access nodes 710, associated with the network node 210 in Coordinated Multi-Point (CoMP) transmissions.

Figure 9:
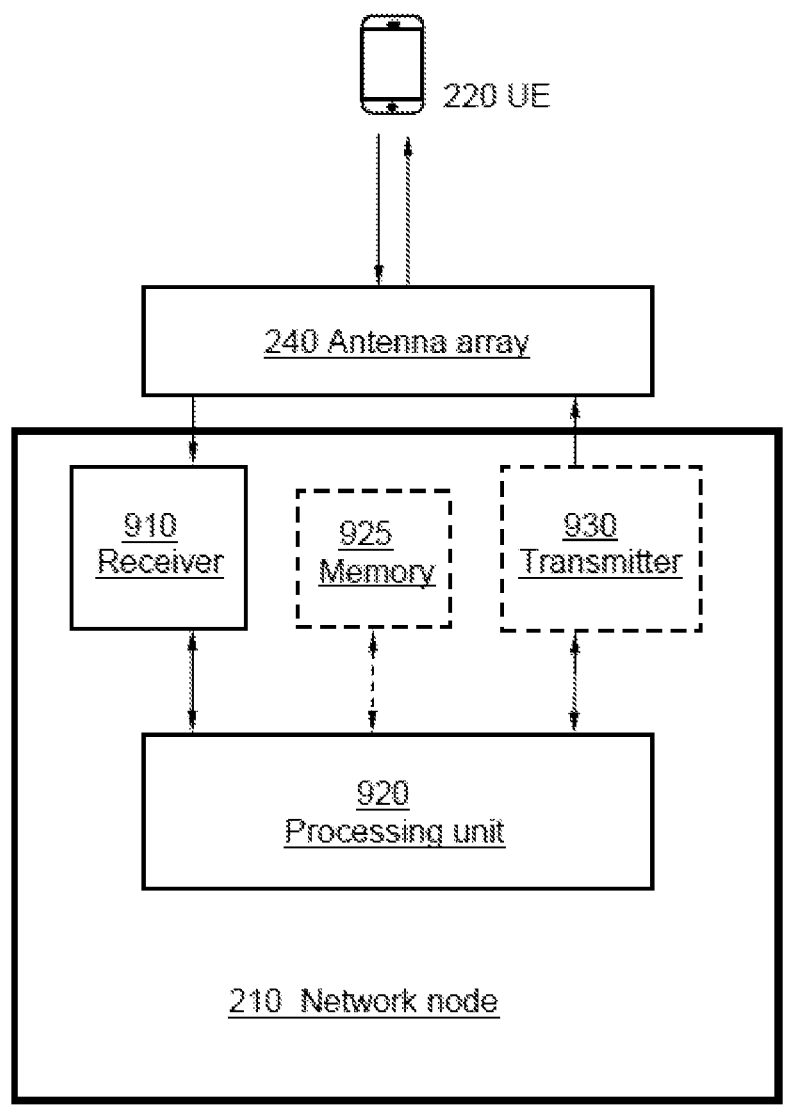
FIG. 9 is a block diagram illustrating a network node architecture according to an embodiment of the invention.

FIG. 9 illustrates an embodiment of a network node 210, configured for wireless communication with UEs 220-1, 220-2, 220-3, 220-4 in a wireless communication system 200.

The network node 210 is configured for performing the method 800, according to any, some, all, or at least one of the enumerated actions 801-813, according to some embodiments. Thus the network node 210 is configured to receive data from a plurality of UEs 220-1, 220-2, 220-3, 220-4 over a plurality of shared time-frequency resources. The network node 210 may be connected to an antenna array 240 with at least one active antenna element 250. However, in some embodiments, the antenna array 240 may comprise a plurality of antenna elements 250, such as tens, or hundreds of antenna elements 250.

The network node 210 may according to some embodiments comprise an evolved NodeB, eNodeB. The wireless communication network 200 may optionally be based on 3rd Generation Partnership Project Long Term Evolution (3GPP LTE).

The network node 210 comprises a processing unit 920. The processing unit 920 is configured to group a plurality of UEs 220-1, 220-2, 220-3, 220-4 into at least a first UE group 260 and a second UE group 270. The processing unit 920 is further configured to assign a mutually orthogonal pilot sequence to each UE 220-1, 220-2 comprised in the first UE group 260. In addition, the processing unit 920 is configured to assign a mutually orthogonal pilot sequence to each UE 220-3, 220-4 comprised in the second UE group 270. Also, the processing unit 920 is furthermore additionally configured to assign a resource-offset to the UEs 220-1, 220-2, 220-3, 220-4 comprised in each UE group 260, 270, by which each UE 220-1, 220-2, 220-3, 220-4 is allowed to start its transmission sub-frame in its Transmission Time Interval (TTI).

The processing unit 920 may be further configured to assign the resource-offset such that the pilot sequences of the UEs 220-1, 220-2 in the first UE group 260 are not interfered by the pilot sequences of the UEs 220-3, 220-4 in the second UE group 270, in some embodiments.

Further, the processing unit 920 may be further configured to assign and transmit a partial blanking pattern sequence to UEs 220-1, 220-2 comprised in at least one of the UE groups 260, wherein the partial blanking pattern sequence may have a granularity equal to granularity of the pilot sequences of UEs 220-3, 220-4 comprised in other UE groups 270, for reducing the interference among the UE groups 260, 270.

The processing unit 920 may also be further configured to update the grouping of UEs 220-1, 220-2, 220-3, 220-4, the assigning of pilot sequences, the assigning of resource-offset sequences or the assigning of partial blanking pattern sequences, based on UE mobility, channel conditions, active number of UEs within range and/or transmission load.

The processing unit 920 may furthermore be configured to group the plurality of UEs 220-1, 220-2, 220-3, 220-4 into at least the first UE group 260 and the second UE group 270, based on cell location of each UE 220-1, 220-2, 220-3, 220-4 in some embodiments.

Furthermore, the processing unit 920 may also be configured to group the UEs 220-1, 220-2 situated within a Macro cell 230 into the first UE group 260, and to group the UEs 220-3, 220-4 situated within a virtual Pico cell 410 into the second UE group 270.

The processing unit 920 may furthermore be configured to group the UEs 220-1, 220-2, 220-3, 220-4, based on Channel Quality Index (CQI) wherein UEs 220-1, 220-2, 220-3, 220-4 associated with a CQI lower than a threshold value are grouped in the first UE group 260.

The processing unit 920 may be further configured to coordinate reception and transmission at a plurality of access nodes 710, associated with the network node 210 in CoMP transmissions.

The processing unit 920 may also be further configured to estimate a channel of each UE 220-1, 220-2 in the first UE group 260, based on the received mutually orthogonal pilot sequences of UEs 220-1, 220-2 grouped in the first UE group 260 in some embodiments.

Also, the processing unit 920 may be further configured to detect the data sequences of the UEs 220-1, 220-2 in the first UE group 260, which data sequences are used to cancel interference over received pilot sequences of UEs 220-3, 220-4 grouped in the second UE group 270.

The processing unit 920 may be further configured to estimate a channel of each UE 220-3, 220-4 in the second UE group 270, based on the received mutually orthogonal pilot sequences of UEs 220-3, 220-4 grouped in the second UE group 270.

Further, the processing unit 920 may be further configured to detect the data sequences of the UEs 220-3, 220-4 in the second UE group 270, wherein the data sequences may be used to cancel interference over the received pilot sequences from UEs 220-1, 220-2 grouped in the first UE group 260.

The processing unit 920 may in some embodiments be further configured to sequentially continue the channel estimation and data detection process, iteratively.

Also, the processing unit 920 may be further configured to instruct at least one UE 220-1, 220-2, 220-3, 220-4 to adjust transmission power, based on at least one of: the channel estimation of each UE group 260, 270 and the interference among the UE groups 260, 270.

Such processing unit 920 may comprise one or more instances of a processing circuit, i.e. a Central Processing Unit (CPU), a processing unit, a processing circuit, a processor, an Application Specific Integrated Circuit (ASIC), a microprocessor, or other processing logic that may interpret and execute instructions. The herein utilised expression "processing unit" may thus represent a processing circuitry comprising a plurality of processing circuits, such as, e.g., any, some or all of the ones enumerated above.

Furthermore, the network node 210 comprises a transmitter 930 configured to transmit the pilot sequences and the resource-offset and possibly also other wireless signals to UEs 220-1, 220-2, 220-3, 220-4.

Further the network node 210 may in addition comprise a receiver 910 configured to receive the mutually orthogonal pilot sequences and data sequences from the UEs 220-1, 220-2 grouped in the first UE group 260 and to receive the mutually orthogonal pilot sequences and data sequences from the UEs 220-3, 220-4 grouped in the second UE group 270, in some embodiments.

Furthermore, the network node 210 may comprise at least one memory 925, according to some embodiments. The optional memory 925 may comprise a physical device utilised to store data or programs, i.e., sequences of instructions, on a temporary or permanent basis. According to some embodiments, the memory 925 may comprise integrated circuits comprising silicon-based transistors. Further, the memory 925 may be volatile or non-volatile.

The actions 801-813 to be performed in the network node 210 may be implemented through the one or more processing circuits 920 in the network node 210, together with computer program product for performing the functions of the actions 801-813. Thus a computer program product, comprising instructions for performing the actions 801-813 in the network node 210 may perform wireless communication with UEs 220-1, 220-2, 220-3, 220-4 in a wireless communication system 200 in antenna streams, when the computer program product is loaded in a processing circuit 920 of the network node 210.

Thus a computer program comprising program code for performing the method 800 according to any of the actions 801-813, may perform wireless communication with UEs 220-1, 220-2, 220-3, 220-4 in a wireless communication system 200, when the computer program is loaded into a processor 920 of the network node 110.

Thereby a computer program product may comprise a computer readable storage medium storing program code thereon for use by a network node 210, for wireless communication with UEs 220-1, 220-2, 220-3, 220-4 in a wireless communication system 200. The program code comprising instructions for executing a method 800 comprising: grouping 801 a plurality of UEs 220-1, 220-2, 220-3, 220-4 into at least a first UE group 260 and a second UE group 270; assigning 802 a mutually orthogonal pilot sequence to each UE 220-1, 220-2 comprised in the first UE group 260; assigning 803 a mutually orthogonal pilot sequence to each UE 220-3, 220-4 comprised in the second UE group 270; assigning 804 a resource-offset to the UEs 220-1, 220-2, 220-3, 220-4 comprised in each UE group 260, 270, by which each UE 220-1, 220-2, 220-3, 220-4 is allowed to start its transmission sub-frame in its Transmission Time Interval (TTI); and transmitting 805 the assigned 802, 803 pilot sequences and the assigned 804 resource-offset to UEs 220-1, 220-2, 220-3, 220-4.

The computer program product mentioned above may be provided for instance in the form of a data carrier carrying computer program code for performing at least some of the actions 801-813 according to some embodiments when being loaded into the processing circuit 920. The data carrier may be, e.g., a hard disk, a compact disc read-only memory (CD ROM) disc, a memory stick, an optical storage device, a magnetic storage device or any other appropriate medium such as a disk or tape that may hold machine readable data in a non-transitory manner. The computer program product may furthermore be provided as computer program code on a server and downloaded to the network node 210 remotely, e.g., over an Internet or an intranet connection.

Figure 10:
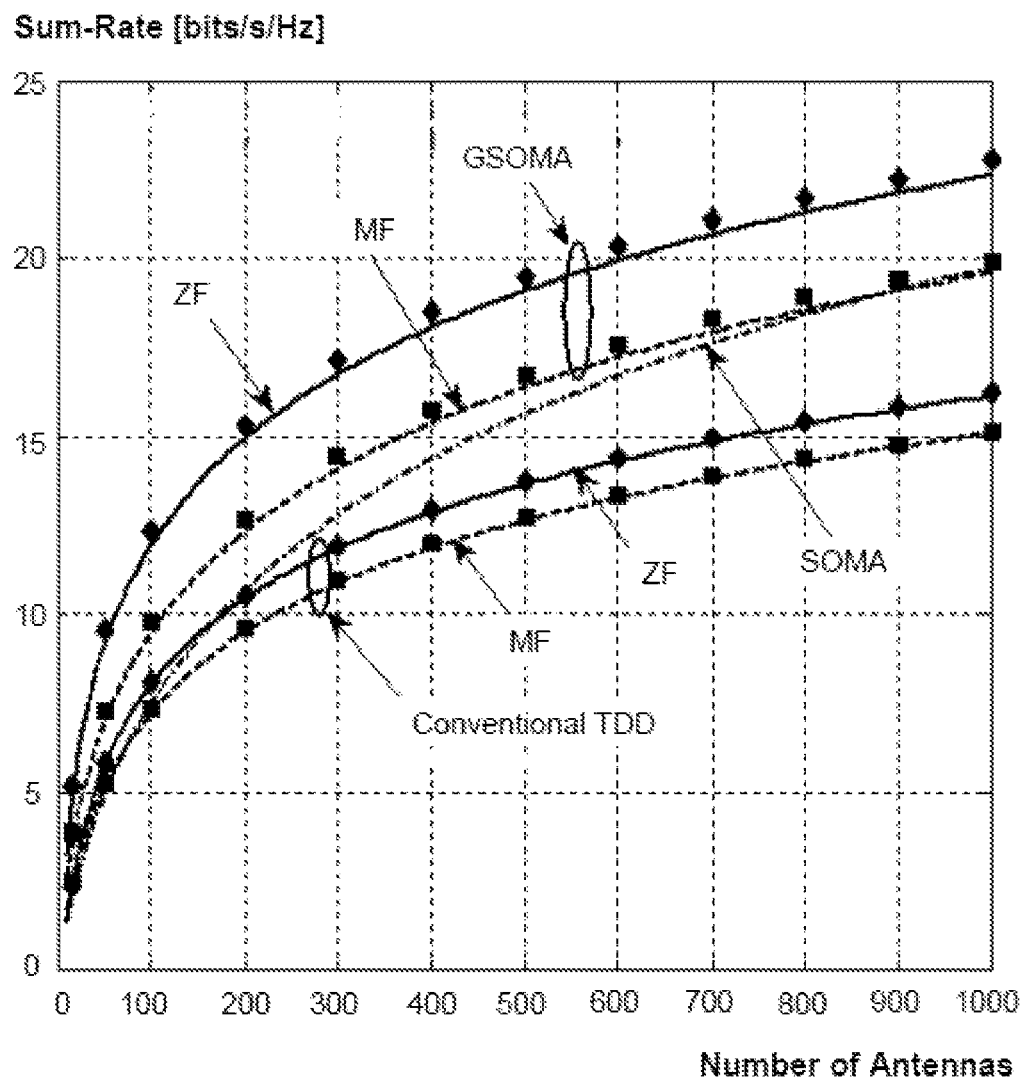
FIG. 10 is a plot illustrating a comparison between different embodiments of the invention and various conventional solutions.

FIG. 10 shows the evaluation results for the coherence time $T_c = 10$, and Rayleigh fading channels where $$\frac{P_{d1}}{N_0} = -10 \text{ dB}, \frac{P_{d2}}{N_0} = \frac{P_{p2}}{N_0} = 5 \text{ dB and } \frac{P_{p1}}{N_0} = 10 \text{ dB}.$$

It may be noted that the pilot power of the UEs 220-1, 220-2 in the first UE group 260 is increased to improve the channel estimation to be used for interference cancellation on the pilot of the UEs 220-3, 220-4 in the second group 270. FIG. 10 plots the average rate obtained by simulating 5000 random channels and computing the associated average rate after Matched Filtering and Zero-Forcing, which are shown by square and diamonds respectively. The analytical bounds in equations (11)-(16) are plotted with dashed and solid lines for Matched Filtering and Zero-Forcing respectively. For the sum-rate 15 [bit/s/Hz], by setting the spatial filtering to be Zero-Forcing, the conventional TDD demands for more than 700 antennas while the new solution requires nearly 200 antennas as compared to the conventional solution, which is a significant reduction. For SOMA, in order to achieve the same rate requires nearly 450 antennas. For 200 and 400 antennas, the gain in throughput with respect to the conventional TDD amounts to nearly 43% and 40%, respectively, and the gain with respect to SOMA amount to nearly 40% and 25%, respectively. The antenna array 240 can collect the energy over multiple paths and hence the access node 210 is capable to recover the noisy received signal in spite of the fact the data power is very low. This hence advocates the use of massive MIMO antenna arrays 240 for establishment of energy-efficient communication systems 200.

Some embodiments of the disclosed method 800 may be applicable in systems 200 combined with multi-carrier modulations, such as OFDM transmission.

The terminology used in the description of the embodiments as illustrated in the accompanying drawings is not intended to be limiting of the described method 800 and/or network node 210. Various changes, substitutions and/or alterations may be made, without departing from the invention as defined by the appended claims.

As used herein, the term "and/or" comprises any and all combinations of one or more of the associated listed items. The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms such as via Internet or other wired or wireless communication system.

Additionally, statements made herein characterizing the invention refer to an embodiment of the invention and not necessarily all embodiments.

What is claimed is:

1. A network node comprising:
    a receiver configured to receive pilot sequences and data sequences from a plurality of user equipment (UEs);
    a processor configured to:
        group the plurality of UEs into at least a first UE group and a second UE group;
        assign mutually orthogonal pilot sequences to UEs comprising the first UE group;
        assign mutually orthogonal pilot sequences to UEs comprising the second UE group;
        assign a resource-offset to the UEs comprised in each UE group, by which each UE is allowed to start its transmission sub-frame in its Transmission Time Interval (TTI);
        estimate a channel of each UE in the first UE group based on the received mutually orthogonal pilot sequences of UEs grouped in the first UE group;
        detect the data sequences of the UEs in the first UE group, wherein the data sequences are used to cancel interference over received pilot sequences of the UEs grouped in the second UE group;
        estimate a channel of each UE in the second UE group based on the received mutually orthogonal pilot sequences of UEs grouped in the second UE group;
        detect the data sequences of the UEs in the second UE group, wherein the data sequences are used to cancel interference over received pilot sequences from the UEs grouped in the first UE group; and
    a transmitter configured to transmit the mutually orthogonal pilot sequences and the resource-offset to the plurality of UEs.

2. The network node according to claim 1, wherein the processor is further configured to assign the resource-offset such that the pilot sequences of the UEs in the first UE group are not interfered with by the pilot sequences of the UEs in the second UE group.

3. The network node according to claim 1, wherein the processor is further configured to assign a partial blanking pattern sequence to UEs comprised in the first UE group, wherein the partial blanking pattern sequence has a granularity equal to granularity of the pilot sequences of UEs comprised in the second UE group, for reducing interference among the UE groups.

4. The network node according to claim 3, wherein the processor is further configured to update the grouping of UEs, the assigning of pilot sequences, the assigning of resource-offset sequences or the assigning of partial blanking pattern sequences, based on UE mobility, channel conditions, active number of UEs within range and transmission load.

5. The network node according to claim 1, wherein the processor is configured to group the plurality of UEs into at least the first UE group and the second UE group based on cell location of each UE.

6. The network node according to claim 5, wherein the processor is furthermore configured to group UEs situated within a Macro cell into the first UE group, and to group UEs situated within a virtual Pico cell into the second UE group.

7. The network node according to claim 5, wherein the processor is furthermore configured to group the UEs based on Channel Quality Index (CQI), wherein UEs associated with a CQI lower than a threshold value are grouped in the first UE group.

8. The network node according to claim 1, wherein the processor is further configured to coordinate reception and transmission at a plurality of access nodes associated with the network node in Coordinated MultiPoint (CoMP) transmissions.

9. The network node according to claim 1, wherein the processor is further configured to sequentially and iteratively continue the channel estimation and data detection process.

10. The network node according to claim 1, wherein the processor is further configured to instruct at least one UE to adjust transmission power, based on the channel estimation of each UE group and/or interference among the UE groups.

11. A method comprising:
    receiving, by a network node, mutually orthogonal pilot sequences and data sequences from a plurality of user equipment (UEs);
    grouping, by the network node, the plurality of UEs into at least a first UE group and a second UE group;
    assigning, by the network node, mutually orthogonal pilot sequences to UEs comprising the first UE group;
    assigning, by the network node, mutually orthogonal pilot sequences to UEs comprising the second UE group;
    assigning, by the network node, a resource-offset to the UEs comprised in each UE group, by which each UE is allowed to start its transmission sub-frame in its Transmission Time Interval (TTI);
    estimating, by the network node, a channel of each UE in the first UE group based on the mutually orthogonal pilot sequences of UEs in the first UE group;
    detecting, by the network node, the data sequences of the UEs in the first UE group, wherein the data sequences are used to cancel interference over received pilot sequences of UEs in the second UE group;
    estimating, by the network node, a channel of each UE in the second UE group based on the mutually orthogonal pilot sequences of UEs in the second UE group;
    detecting, by the network node, the data sequences of the UEs in the second UE group, wherein the data sequences are used to cancel interference over the received pilot sequences from UEs in the first UE group; and
    transmitting, by the network node, the assigned pilot sequences and the assigned resource-offset to UEs.

12. The method according to claim 11, wherein the resource-offset is assigned such that the pilot sequences of the UEs in the first UE group are not interfered by the pilot sequences of the UEs in the second UE group.

13. The method according to claim 11, further comprising;
assigning and transmitting a partial blanking pattern sequence to UEs comprised in the first UE group, wherein the partial blanking pattern sequence has a granularity equal to a granularity of the pilot sequences of UEs comprised in the second UE group for reducing the interference among the UE groups.

14. The method according to claim 13, further comprising;
updating the grouping of UEs, the assigning of pilot sequences, the assigning of resource-offset sequences or the assigning of partial blanking pattern sequences, based on UE mobility, channel conditions, active number of UEs within range and transmission load.

15. The method according to claim 11, wherein the plurality of UEs are grouped into at least the first UE group and the second UE group based on cell location of each UE.

16. A non-transitory computer readable medium having processor-executable instructions stored thereon, the processor-executable instructions, when executed, facilitating performance of the following:
receiving mutually orthogonal pilot sequences and data sequences from a plurality of user equipment (UEs);
grouping the plurality of UEs into at least a first UE group and a second UE group;
assigning mutually orthogonal pilot sequences to UEs comprising the first UE group;
assigning mutually orthogonal pilot sequences to UEs comprising the second UE group;
assigning a resource-offset to the UEs comprised in each UE group, by which each UE is allowed to start its transmission sub-frame in its Transmission Time Interval (TTI);
estimating a channel of each UE in the first UE group based on the mutually orthogonal pilot sequences of UEs in the first UE group;
detecting the data sequences of the UEs in the first UE group, wherein the data sequences are used to cancel interference over received pilot sequences of UEs in the second UE group;
estimating a channel of each UE in the second UE group based on the mutually orthogonal pilot sequences of UEs in the second UE group;
detecting the data sequences of the UEs in the second UE group, wherein the data sequences are used to cancel interference over the received pilot sequences from UEs in the first UE group; and
transmitting the assigned pilot sequences and the assigned resource-offset to UEs.

17. The non-transitory computer readable medium according to claim 16, wherein the resource-offset is assigned such that the pilot sequences of the UEs in the first UE group are not interfered by the pilot sequences of the UEs in the second UE group.

18. The non-transitory computer readable medium according to claim 16, further comprising:
assigning and transmitting a partial blanking pattern sequence to UEs comprised in the first UE group, wherein the partial blanking pattern sequence has a granularity equal to a granularity of the pilot sequences of UEs comprised in the second UE group, for reducing the interference among the UE groups.

19. The non-transitory computer readable medium according to claim 18, further comprising:
updating the grouping of UEs, the assigning of pilot sequences, the assigning of resource-offset sequences or the assigning of partial blanking pattern sequences, based on UE mobility, channel conditions, active number of UEs within range and transmission load.

20. The non-transitory computer readable medium according to claim 16, wherein the plurality of UEs are grouped into at least the first UE group and the second UE group based on cell location of each UE.

* * * * *

UNITED STATES PATENT AND TRADEMARK OFFICE
CERTIFICATE OF CORRECTION

PATENT NO. : 10,270,569 B2  
APPLICATION NO. : 15/388997  
DATED : April 23, 2019  
INVENTOR(S) : Majid Nasiri Khormuji It is certified that error appears in the above-identified patent and that said Letters Patent is hereby corrected as shown below:

In the Claims

Claim 8, Column 30, Line 23 "Coordinated MultiPoint" should read -- Coordinated Multi-Point --.

Claim 13, Column 31, Lines 1-2 "further comprising;" should read -- further comprising: --.

Claim 14, Column 31, Lines 9-10 "further comprising;" should read -- further comprising: --.

Signed and Sealed this  
Twenty-first Day of January, 2020

Andrei Iancu  
*Director of the United States Patent and Trademark Office*